(12) United States Patent
Hamada et al.

(10) Patent No.: US 11,183,180 B2
(45) Date of Patent: Nov. 23, 2021

(54) SPEECH RECOGNITION APPARATUS, SPEECH RECOGNITION METHOD, AND A RECORDING MEDIUM PERFORMING A SUPPRESSION PROCESS FOR CATEGORIES OF NOISE

(71) Applicant: FUJITSU LIMITED, Kawasaki (JP)

(72) Inventors: Yusuke Hamada, Ota (JP); Kousuke Iemura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 167 days.

(21) Appl. No.: 16/518,397

(22) Filed: Jul. 22, 2019

(65) Prior Publication Data

US 2020/0074996 A1 Mar. 5, 2020

(30) Foreign Application Priority Data

Aug. 29, 2018 (JP) .............................. JP2018-160515

(51) Int. Cl.
G10L 15/20 (2006.01)
G10L 21/0208 (2013.01)
G10L 25/84 (2013.01)
G10L 15/32 (2013.01)
G10L 15/22 (2006.01)
G10L 21/0232 (2013.01)

(52) U.S. Cl.
CPC .............. G10L 15/20 (2013.01); G10L 15/22 (2013.01); G10L 15/32 (2013.01); G10L 21/0232 (2013.01); G10L 25/84 (2013.01)

(58) Field of Classification Search
CPC ............................ G10L 21/0208; G10L 15/20
See application file for complete search history.

(56) References Cited

U.S. PATENT DOCUMENTS

| 2004/0165736 A1* | 8/2004 | Hetherington ...... G10L 21/0232 381/94.3 |
| 2006/0031067 A1 | 2/2006 | Kaminuma |
| 2010/0004930 A1* | 1/2010 | Strope ..................... G10L 15/26 704/240 |
| 2012/0022864 A1* | 1/2012 | Leman ..................... G10L 25/00 704/233 |
| 2014/0278393 A1* | 9/2014 | Ivanov ..................... G10L 15/20 704/233 |
| 2014/0337021 A1* | 11/2014 | Kim ......................... G10L 25/81 704/228 |
| 2016/0111107 A1* | 4/2016 | Erdogan ............. G10L 21/0324 704/226 |
| 2016/0217795 A1* | 7/2016 | Lee ......................... G10L 15/30 |
| 2018/0350358 A1 | 12/2018 | Tachioka |

FOREIGN PATENT DOCUMENTS

| JP | 5-54068 | 3/1993 |
| JP | 2006-84898 | 3/2006 |
| JP | 2009-31809 | 2/2009 |
| WO | WO 2017/094121 | 6/2017 |

* cited by examiner

Primary Examiner — Jialong He
(74) Attorney, Agent, or Firm — Staas & Halsey, LLP

(57) ABSTRACT

A speech recognition method causes a computer to execute a speech recognition process. The process includes: extracting features of noise or unwanted sound included in speech data to be recognized; performing, for the speech data, a suppression process for each of the extracted features of noise or unwanted sound among suppression processes for respective features of noise or unwanted sound; and performing speech recognition for the speech data after the suppression process is performed.

6 Claims, 20 Drawing Sheets

SPEECH RECOGNITION APPARATUS, SPEECH RECOGNITION METHOD, AND A RECORDING MEDIUM PERFORMING A SUPPRESSION PROCESS FOR CATEGORIES OF NOISE

CROSS-REFERENCE TO RELATED APPLICATION

This application is based upon and claims the benefit of priority of the prior Japanese Patent Application No. 2018-160515, filed on Aug. 29, 2018, the entire contents of which are incorporated herein by reference.

FIELD

The embodiment discussed herein is related to a speech recognition apparatus, a speech recognition method, and a recording medium having stored therein a speech recognition program.

BACKGROUND

In some speech recognition where the words of someone's speech are recognized from speech data and transcribed into characters, preliminary suppression processing to suppress noise and the like has heretofore been performed in advance, because the speech recognition accuracy decreases in noisy conditions or noisy environment. In a known technique of related art to perform such suppression processing for noise and the like in speech recognition, one of a plurality of suppression units to perform suppression processes using different methods is selected to perform the suppression processing for noise and the like. Examples of related art are disclosed in International Publication Pamphlet No. WO 2017/94121, and Japanese Laid-open Patent Publication Nos. 2009-31809, 5-54068, and 2006-84898.

However, the above technique of related art, in which any of the noise suppression processes using the respectively different methods is executed, has is a problem that improvement of a recognition rate of speech recognition may be limited. For example, noise or unwanted sound that is not a speech recognition target included in the speech data may be superimposed from a plurality of sound sources. Therefore, it is difficult to suppress all the superimposed noise or unwanted sound with any one of the suppression processes for noise and the like.

According to one aspect, provided are a speech recognition apparatus, a speech recognition method, and a recording medium having stored therein a speech recognition program, which are capable of improving a speech recognition rate in noisy conditions or noisy environment.

SUMMARY

According to an aspect of the embodiments, a speech recognition method causes a computer to execute a speech recognition process. The process includes: extracting features of noise or unwanted sound included in speech data to be recognized; performing, for the speech data, a suppression process for each of the extracted features of noise or unwanted sound among suppression processes for respective features of noise or unwanted sound; and performing speech recognition for the speech data after the suppression process is performed.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
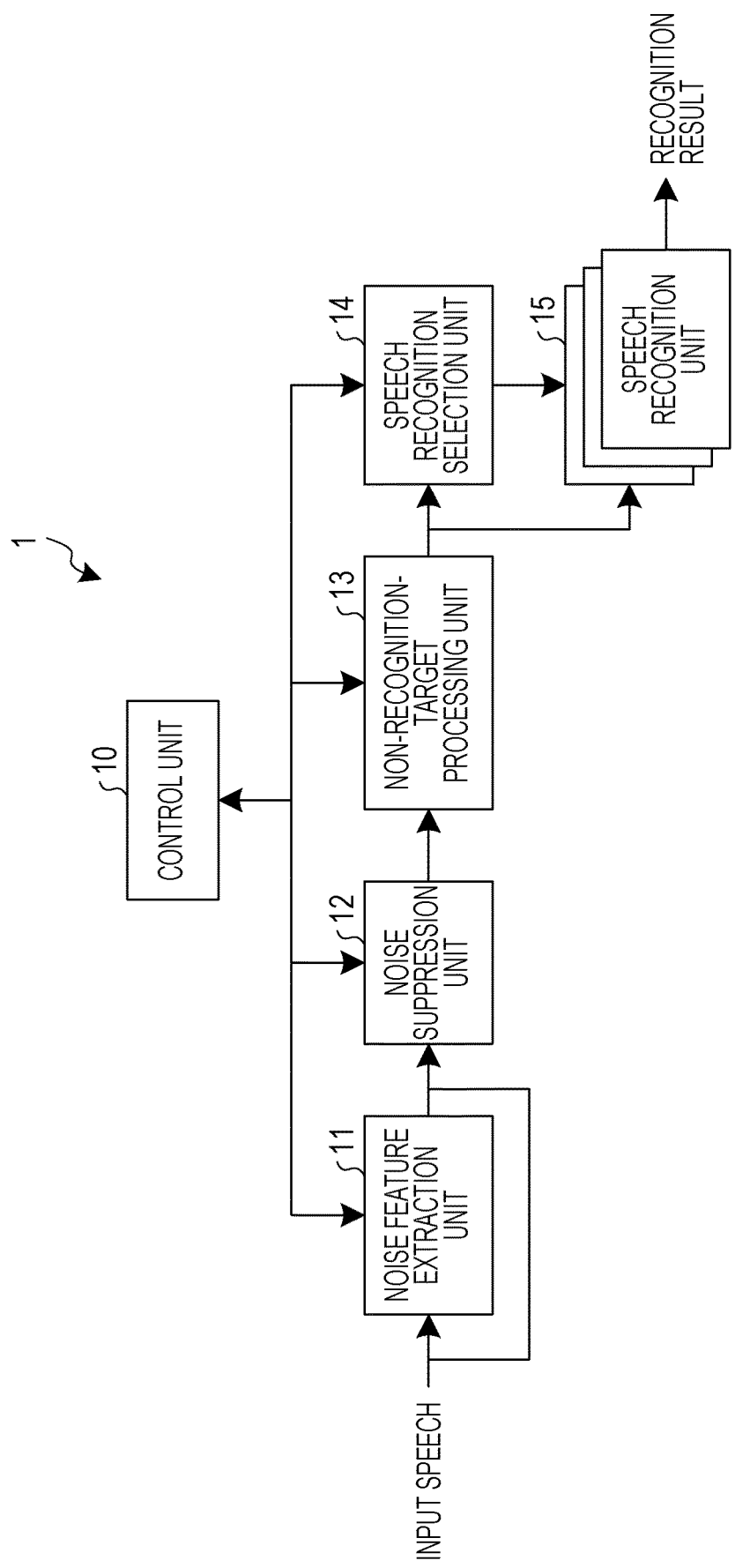
FIG. 1 is a block diagram illustrating a functional configuration example of a speech recognition apparatus according to an embodiment.

Hereinafter, with reference to the drawings, description is given of a speech recognition apparatus, a speech recognition method, and a recording medium having stored therein a speech recognition program, according to an embodiment. In this embodiment, constituent components having the same functions are denoted by the same reference numerals, and repetitive description thereof is omitted. The speech recognition apparatus, the speech recognition method, and the recording medium having stored therein a speech recognition program, described in the following embodiment are merely an example and not intended to limit the embodiment. The respective embodiments may be combined as appropriate without causing any inconsistency.

FIG. 1 is a block diagram illustrating a functional configuration example of the speech recognition apparatus according to the embodiment. As illustrated in FIG. 1, a speech recognition apparatus 1 is an information processor that receives an input speech (speech data) to be a speech recognition target, and outputs a recognition result having the speech transformed into a text to a file, a display, or the like. For example, a personal computer (PC) or the like is applicable as the speech recognition apparatus 1.

For example, the speech recognition apparatus 1 includes a control unit 10, a noise feature extraction unit 11, a noise suppression unit 12, a non-recognition-target processing unit 13, a speech recognition selection unit 14, and a speech recognition unit 15.

The control unit 10 is a processing unit that controls the entire processing performed by the noise feature extraction unit 11, the noise suppression unit 12, the non-recognition-target processing unit 13, the speech recognition selection unit 14, and the speech recognition unit 15.

The noise feature extraction unit 11 is a processing unit that extracts features of noise or unwanted sound included in the input speech, under the control of the control unit 10. For example, the noise feature extraction unit 11 is an example of an extraction unit.

The input speech includes noise or unwanted sound such as BGM (background music), environmental sound (for example, street crowds, dog barking, and the like), and sound effects from an electronic device, together with a human voice as a recognition target to be transformed into a text. The noise feature extraction unit 11 extracts features of such noise or unwanted sound included in the input speech, that is, determines which one of the categories, BGM, environmental sound, and sound effect, the noise or unwanted sound falls into.

For example, when the input speech includes BGM together with the human voice as the recognition target, the noise feature extraction unit 11 extracts BGM as the category indicating the feature of the noise or unwanted sound. When the input speech includes BGM and environmental sound, the noise feature extraction unit 11 extracts BGM and environmental sound as the categories indicating the features of the noise or unwanted sound.

The noise suppression unit 12 is a processing unit that suppresses (reduces) the noise or unwanted sound other than the human voice as the recognition target from the input speech, in order to perform speech recognition, under the control of the control unit 10. For example, the noise suppression unit 12 performs noise suppression processing for the input speech by executing the noise suppression process for each of the extracted features of noise or unwanted sound among noise suppression processes for the respective features of noise or the like. For example, the noise suppression unit 12 is an example of a suppression unit.

The non-recognition-target processing unit 13 is a processing unit that determines a voice not to be recognized in the speech recognition, even though the voice is a human voice to be recognized, for the input speech after noise suppression, and silences the non-recognition-target voice, under the control of the control unit 10. Examples of such non-recognition-target voice include sound of a speech language (for example, English) different from a speech language (for example, Japanese) to be recognized, cheering, laughter, and the like.

The speech recognition selection unit 14 selects a speech recognition engine to be used for the input speech, from among a plurality of speech recognition engines in the speech recognition unit 15, under the control of the control unit 10. There are a variety of speech recognition engines to transform a speech into a text depending on speech language, situation, and the like. For example, what is commonly called speech recognition is known to be able to obtain a better speech recognition result by selecting an optimum speech recognition engine based on the tone of spoken words, conversation topic, and the like.

The speech recognition selection unit 14 estimates a recognition rate for each of the plurality of speech recognition engines in the speech recognition unit 15, based on a feature amount of the speech (human voice to be recognized) included in the speech data after noise suppression outputted from the non-recognition-target processing unit 13. Then, based on the estimated recognition rates, the speech recognition selection unit 14 selects a speech recognition engine estimated to have the highest recognition rate, for example, from among the plurality of speech recognition engines. For example, the speech recognition selection unit 14 is an example of a selection unit.

The speech recognition unit 15 is a processing unit including the plurality of speech recognition engines to transform a speech into a text, and that performs speech recognition for the input speech after suppression of noise or unwanted sound, with the speech recognition engine selected by the speech recognition selection unit 14, under the control of the control unit 10. The speech recognition unit 15 outputs a recognition result obtained by the speech recognition engine for the speech (human voice) as the recognition target included in the input speech. For example, the speech recognition unit 15 is an example of a recognition unit.

Figure 2:
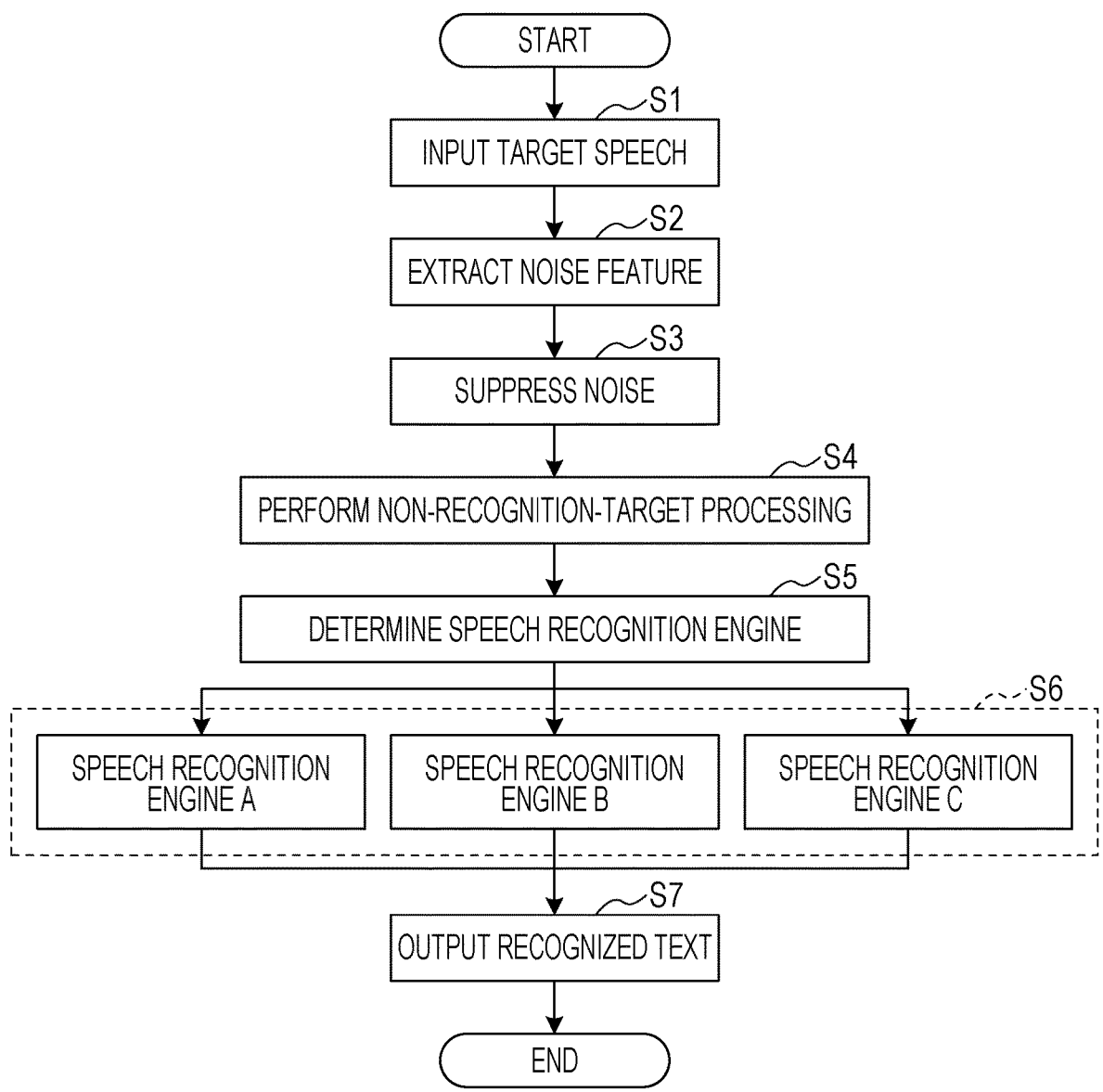
FIG. 2 is a flowchart illustrating an operation example of the speech recognition apparatus according to the embodiment.

Next, description is given of details of the processing performed by the noise feature extraction unit 11, the noise suppression unit 12, the non-recognition-target processing unit 13, the speech recognition selection unit 14, and the speech recognition unit 15, together with an operation example of the speech recognition apparatus 1 performed under the control of the control unit 10. FIG. 2 is a flowchart illustrating an operation example of the speech recognition apparatus 1 according to the embodiment.

As illustrated in FIG. 2, once processing is started, the control unit 10 receives input of a target speech to be subjected to speech recognition, and inputs the received speech to the noise feature extraction unit 11 (S1). Next, the noise feature extraction unit 11 extracts features of noise or unwanted sound included in the target speech (S2).

For example, the noise feature extraction unit 11 prepares in advance a database of noise or unwanted sound such as BGM, environmental sound, and sound effects, and uses a method such as deep learning using such noise or unwanted sound as a teacher to perform learning of a learning model that is a neural network for determining features of the noise or unwanted sound. Then, the noise feature extraction unit 11 inputs the target speech to the learned learning model to obtain an inference result for the features of the noise or unwanted sound, thereby extracting (determining) the features of the noise or unwanted sound included in the target speech.

Figure 3:
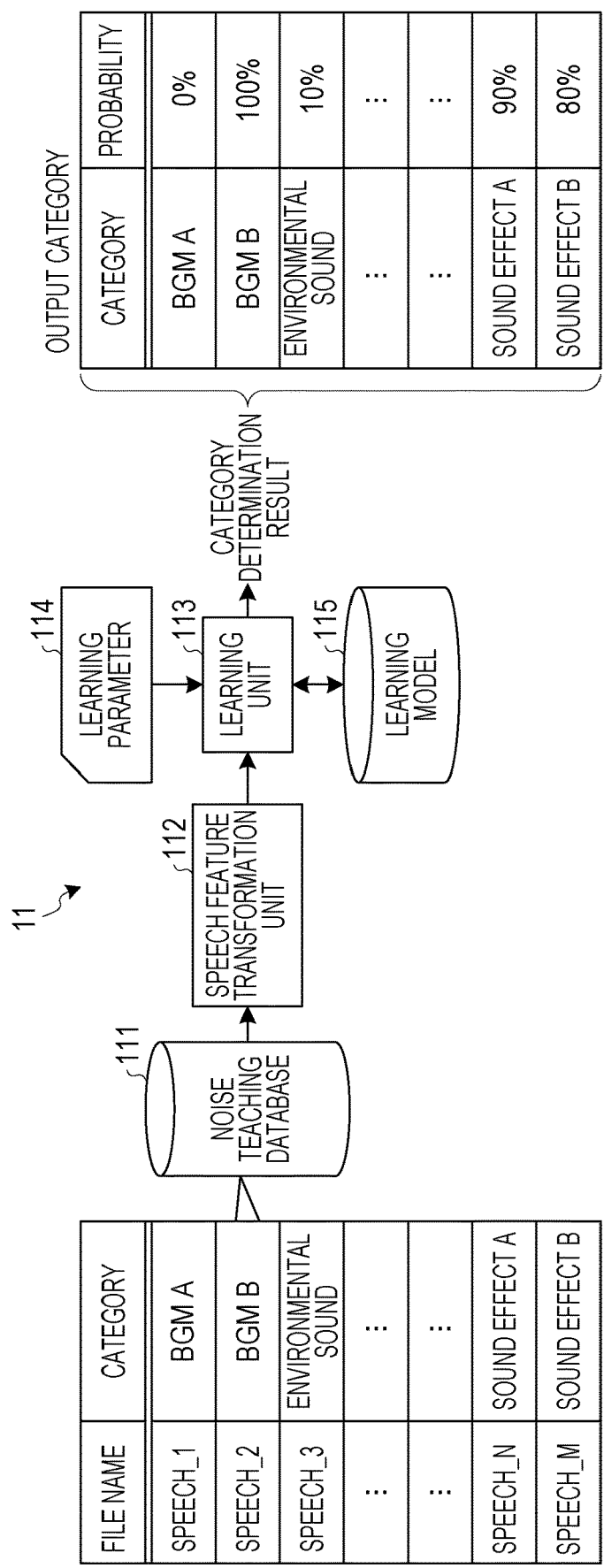
FIG. 3 is a block diagram illustrating a functional configuration example for learning by a noise feature extraction unit.

FIG. 3 is a block diagram illustrating a functional configuration example for learning by the noise feature extraction unit 11. As illustrated in FIG. 3, the noise feature extraction unit 11 includes a noise teaching database 111, a speech feature transformation unit 112, a learning unit 113, a learning parameter 114, and a learning model 115, as a functional configuration for learning.

The noise teaching database 111 is a database that manages a speech file including various noises or unwanted sounds such as BGM, environmental sound, and sound effects in association with values of categories indicating the features of the noises or unwanted sounds included in the speech file. In the noise teaching database 111, the speech data categorized by the features of the noise or unwanted sound is teaching data for use in learning of the learning model 115 for determining the features of the noise or unwanted sound.

The speech feature transformation unit 112 performs speech feature transformation for the speech data included in the speech file in the noise teaching database 111, and then outputs the resultant speech data to the learning unit 113 together with the category value. The speech feature transformation is spectrogram transformation or transformation into a commonly used speech feature amount such as Mel-frequency cepstrum coefficients (MFCC).

The learning unit 113 uses the speech feature amount obtained through the speech feature transformation unit 112 and the category value as teaching data to perform learning of the learning model 115 that is a neural network (hereinafter referred to as NN) for determining the feature (category) of the noise or unwanted sound.

For example, the learning unit 113 builds an NN by referring to preset values for learning and the learning parameter 114 such as a hyper parameter for building an initial NN. Then, the learning unit 113 inputs the speech feature amount obtained through the speech feature transformation unit 112 to the built NN, and compares the output thereof with the category value in the teaching data. When there is an error as a result of the comparison, the learning unit 113 uses an error backpropagation method or the like to update weight in each node of the NN. By repeating this step while referring to the teaching data in the noise teaching database 111, the learning unit 113 obtains a learned learning model 115 with the learned weight for each node of the NN.

Figure 4:
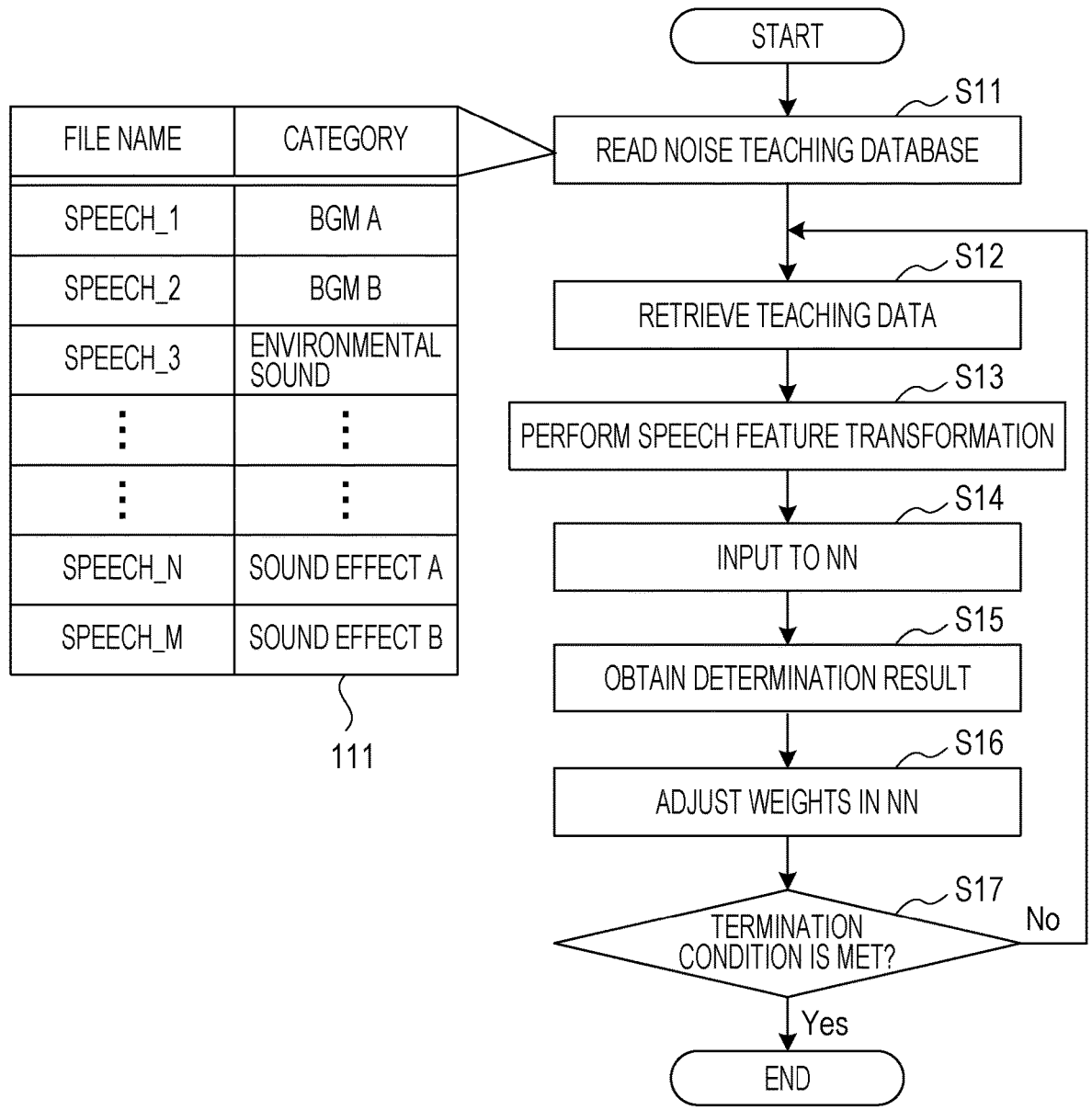
FIG. 4 is a flowchart illustrating an operation example for the learning by the noise feature extraction unit.

FIG. 4 is a flowchart illustrating an operation example for the learning by the noise feature extraction unit 11. As illustrated in FIG. 4, once processing is started, the speech feature transformation unit 112 reads the noise teaching database 111 (S11) to retrieve teaching data including a speech file and a category value as a pair (S12). Next, the speech feature transformation unit 112 performs speech feature transformation for speech data included in the speech file (S13).

Then, the learning unit 113 inputs the speech feature amount after the feature transformation to the NN (S14) and obtains a determination result from the NN (S15). Thereafter, the learning unit 113 calculates an error (difference) by comparing the determination result from the NN with the category value (correct answer information) in the teaching data. Subsequently, the learning unit 113 performs the error backpropagation method for changing and approximating the parameters of each node in the NN to an optimum solution by back-propagating the obtained difference to the NN, thus adjusting the weight of each node in the NN (S16).

Next, the learning unit 113 determines whether or not a predetermined termination condition is met, such as that the error in the determination result falls below a specified value of the learning parameter 114 (S17). When the termination condition is not met (S17: NO), the learning unit 113 returns the processing to S12 to repeat learning using another pair of teaching data. When the termination condition is met (S17: YES), the learning unit 113 saves the weight of each node in the NN as the learning model 115, and then terminates the processing.

Figure 5:
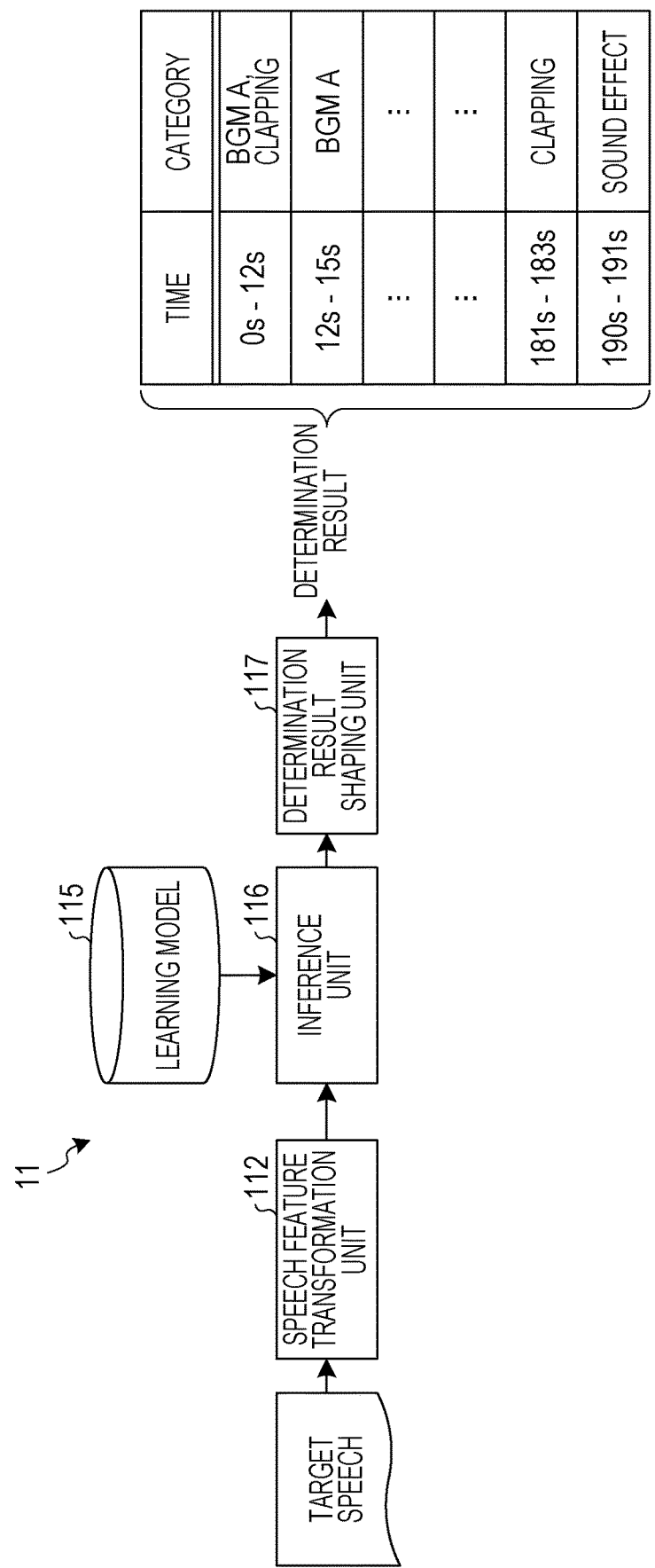
FIG. 5 is a block diagram illustrating a functional configuration example for inference by the noise feature extraction unit.

FIG. 5 is a block diagram illustrating a functional configuration example for inference by the noise feature extraction unit 11. As illustrated in FIG. 5, the noise feature extraction unit 11 includes the speech feature transformation unit 112, the learning model 115, an inference unit 116, and a determination result shaping unit 117.

The speech feature transformation unit 112 transforms a target speech to be subjected to speech recognition into a speech feature amount at predetermined time intervals (for example, by several seconds) as in the case of the learning. The learning model 115 is the weight of each node in the NN obtained by the learning, or the like.

The inference unit 116 uses the NN built based on the learned learning model 115 to infer (determine) the feature (category value) of the noise or unwanted sound included in the target speech. For example, the inference unit 116 inputs the speech feature amount after the feature transformation by the speech feature transformation unit 112 to the NN, and obtains output of the determination result from the NN.

The determination result shaping unit 117 shapes and outputs the category based on the determination result obtained from the inference unit 116 at the predetermined time intervals for the target speech. For example, the determination result shaping unit 117 sets the category for which the value indicating the accuracy of each category is a predetermined value or more, in the determination result for a predetermined time interval, as the feature of noise or unwanted sound in the time interval. For example, when the accuracy of the category "BGM A" and "clapping" in the time interval between 0 s and 12 s is the predetermined value or more, "BGM A" and "clapping" are set as features of noise or unwanted sound included in a speech within the time interval.

Figure 6:
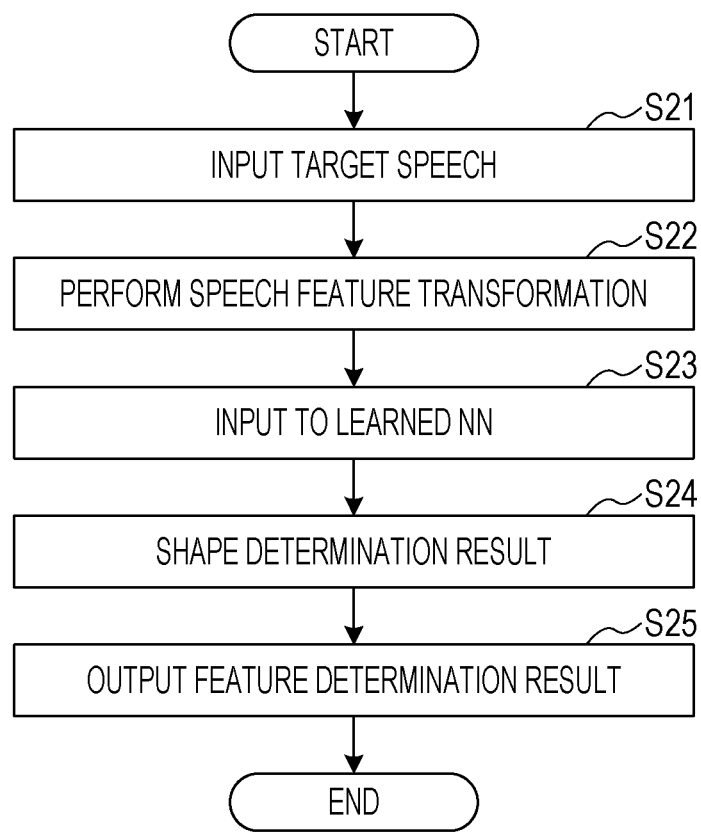
FIG. 6 is a flowchart illustrating an operation example for the inference by the noise feature extraction unit.

FIG. 6 is a flowchart illustrating an operation example for the inference by the noise feature extraction unit 11. As illustrated in FIG. 6, once processing is started, the speech feature transformation unit 112 receives input of a target speech (S21) and performs feature transformation of the target speech at predetermined time intervals (S22).

Next, the inference unit 116 inputs the speech feature amount obtained by the feature transformation to the NN using the learned learning model 115 (S23) and obtains a determination result for each time interval (S23). Then, the determination result shaping unit 117 shapes the determination result obtained by the inference unit 116 for each time interval (S24) and outputs the determination result for the feature of noise or unwanted sound in each time interval (S25).

Referring back to FIG. 2, after S2, the noise suppression unit 12 performs noise suppression processing for the target speech by executing the noise suppression process for each of the extracted features of noise or unwanted sound among the noise suppression processes for the respective features of noise or unwanted sound. Thus, the noise suppression unit 12 suppresses noise or unwanted sound other than a human voice to be a recognition target (S3).

For example, the noise suppression unit 12 prepares a database of various noises, and uses a method such as deep learning using such various noises or unwanted sound as a teacher to perform learning of a learning model that is a neural network such as leaving a human voice by suppressing noise or unwanted sound. Then, the noise suppression unit 12 inputs the target speech to the learning model learned for the extracted features of the noise or unwanted sound, and thus obtains an inference result with suppressed noise or unwanted sound, thereby suppressing the noise or unwanted sound included in the target speech.

Figure 7:
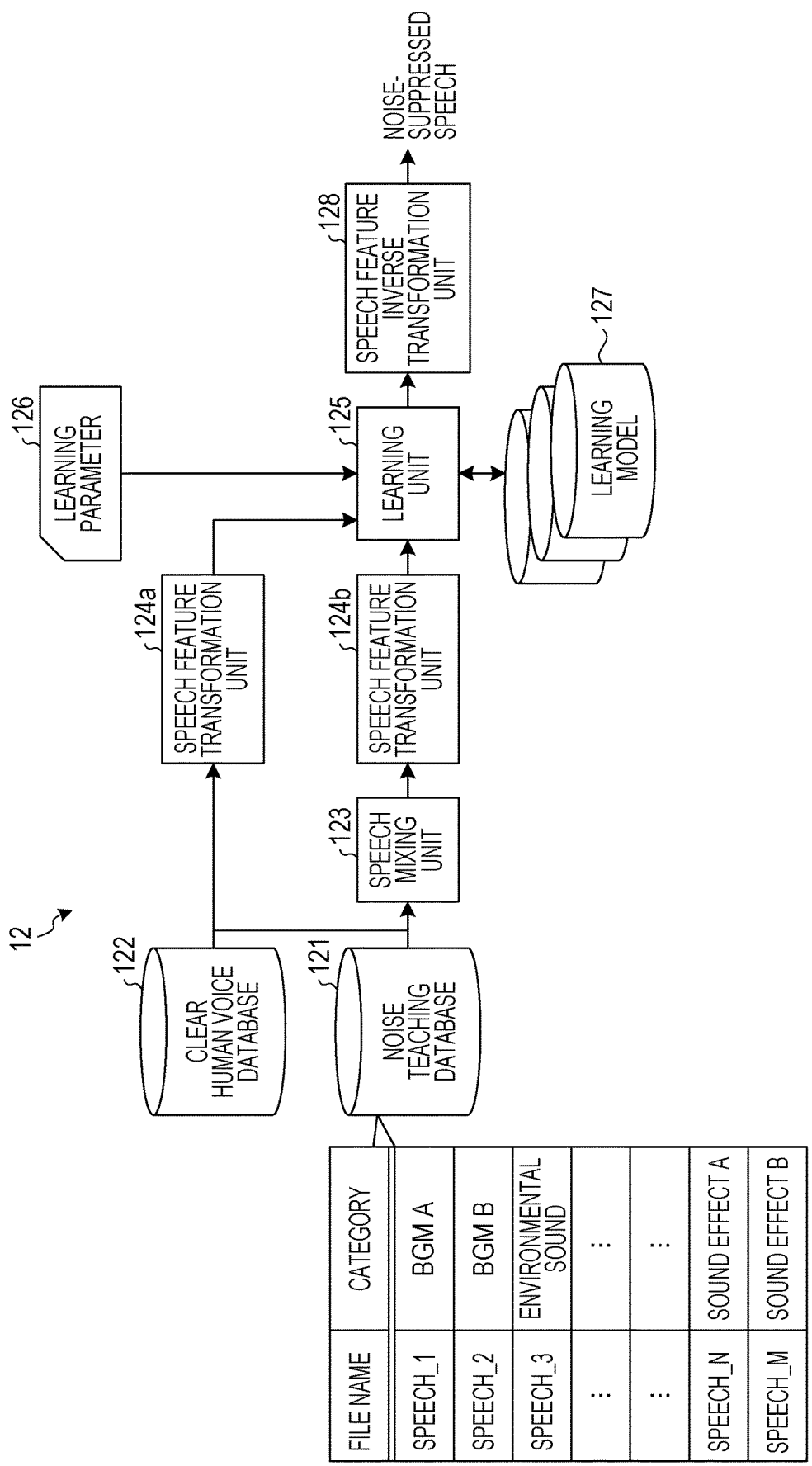
FIG. 7 is a block diagram illustrating a functional configuration example for learning by a noise suppression unit.

FIG. 7 is a block diagram illustrating a functional configuration example for learning by the noise suppression unit 12. As illustrated in FIG. 7, the noise suppression unit 12 includes a noise teaching database 121, a clear human voice database 122, a speech mixing unit 123, speech feature transformation units 124a and 124b, a learning unit 125, a learning parameter 126, a learning model 127, and a speech feature inverse transformation unit 128.

The noise teaching database 121 is a database that manages a speech file including various noises or unwanted sounds such as BGM, environmental sound, and sound effects in association with values of categories indicating the features of the noises or unwanted sounds included in the speech file. The clear human voice database 122 is a database that manages speech data including a clear human voice without noise or unwanted sound. The speech data in the noise teaching database 121 and the clear human voice database 122 is teaching data for use in learning of the learning model 127 for suppressing the noise or unwanted sound.

The speech mixing unit 123 performs commonly known speech mixing processing to mix speeches included in the noise teaching database 121 and the clear human voice database 122.

The speech feature transformation unit 124a uses a heretofore known transformation method such as Fourier transformation to perform speech feature transformation for the speech data including a clear human voice in the clear human voice database 122, and then outputs the resultant speech data to the learning unit 125. The speech feature transformation unit 124b uses the heretofore known transformation method such as Fourier transformation to perform speech feature transformation for the speech data obtained by the speech mixing unit 123 mixing the clear human voice with the noise or unwanted sound, and then outputs the resultant speech data to the learning unit 125.

The learning unit 125 uses, as teaching data, the speech feature amount for the clear human voice and the speech feature amount for the speech obtained by mixing the clear human voice with noise or unwanted sound to perform learning of the learning model 127 that is the NN for suppressing the noise or unwanted sound.

For example, the learning unit 125 builds an NN by referring to preset values for learning and the learning parameter 126 such as a hyper parameter for building an initial NN. Next, the learning unit 125 inputs the speech feature amount obtained through the speech feature transformation unit 124b to the built NN, and compares the output result thereof with the speech feature amount (correct answer information) obtained through the speech feature transformation unit 124a. When there is an error as a result of the comparison, the learning unit 125 uses an error backpropagation method or the like to update weight in each node of the NN.

By repeating this step for each feature of the noise in the noise teaching database 121, the learning unit 125 obtains a learned learning model 127 with the learned weight for each node of the NN for each feature of the noise or unwanted sound. For example, the learning unit 125 obtains a plurality of learning models 127 to perform noise suppression processes for the respective features of the noise or unwanted sound.

The speech feature inverse transformation unit 128 performs transformation (for example, inverse Fourier transformation) inverse to the transformation processing performed by the speech feature transformation units 124a and 124b on the output from the NN in the learning model 127 to restore the speech data with suppressed noise or unwanted sound.

Figure 8:
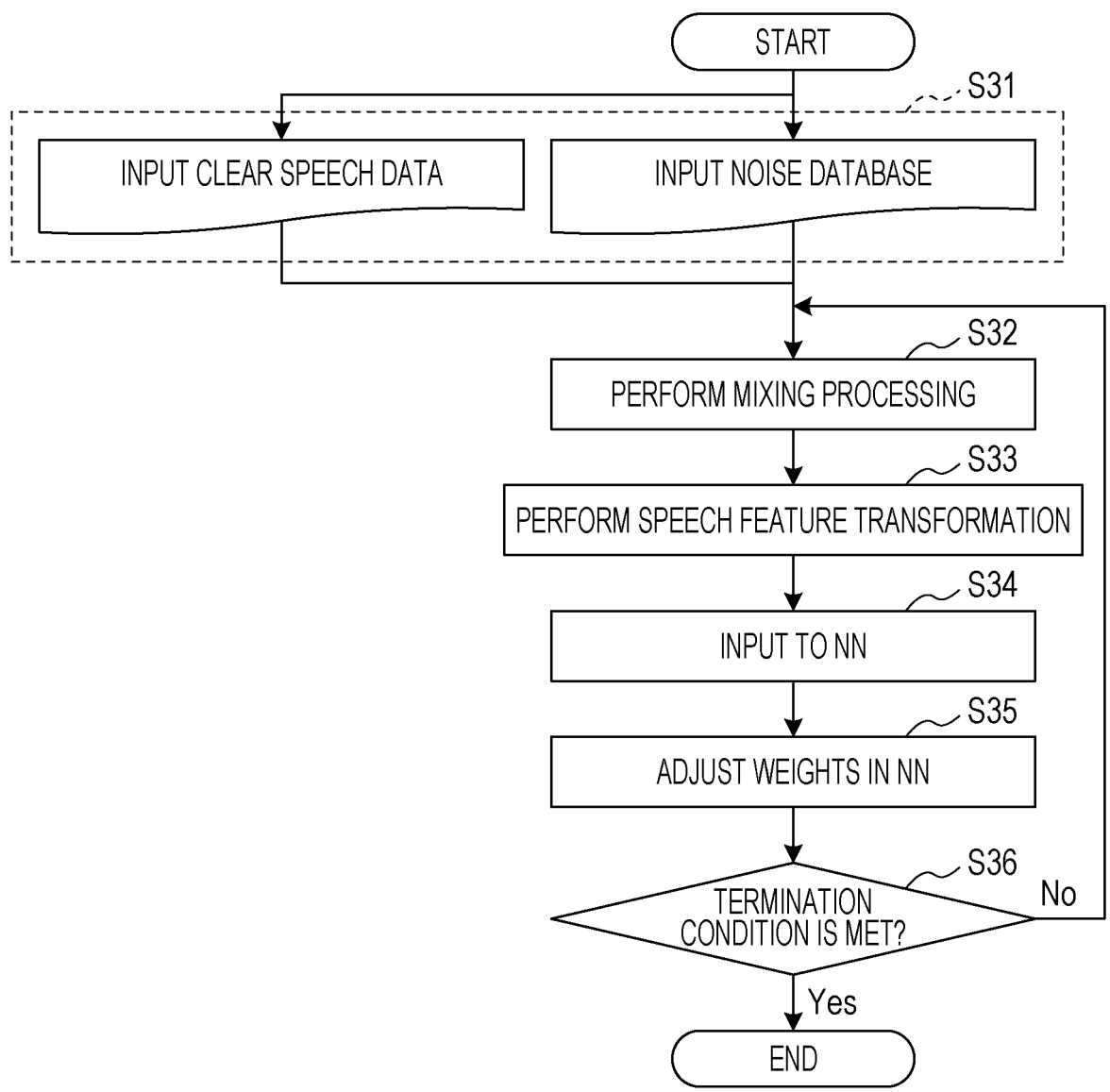
FIG. 8 is a flowchart illustrating an operation example for the learning by the noise suppression unit.

FIG. 8 is a flowchart illustrating an operation example for the learning by the noise suppression unit 12. As illustrated in FIG. 8, once processing is started, the speech feature transformation unit 124a and the speech mixing unit 123 retrieve speech data from the clear human voice database 122 and the noise teaching database 121 (S31). For example, the speech feature transformation unit 124a retrieves speech data of clear human voice from the clear human voice database 122, and inputs the speech data. The speech mixing unit 123 retrieves speech data of clear human voice from the clear human voice database 122 and speech data of noise or unwanted sound from the noise teaching database 121, and inputs the both speech data.

Next, the speech mixing unit 123 mixes the speech data of clear human voice with the speech data of noise or unwanted sound (S32), and inputs the mixed speech data to the speech feature transformation unit 124b. Then, the speech feature transformation units 124a and 124b output the inputted speech data to the learning unit 125 after performing speech feature transformation thereof (S33).

Thereafter, the learning unit 125 inputs the speech feature amount after the feature transformation of the mixed speech to the NN, and obtains an output result from the NN (S34). Subsequently, the learning unit 125 calculates an error (difference) by comparing the output result from the NN with the speech feature amount (correct answer information) of the clear human voice. Then, the learning unit 125 performs the error backpropagation method for changing and approximating the parameters of each node in the NN to an optimum solution by back-propagating the obtained difference to the NN, thus adjusting the weight of each node in the NN (S35).

Next, the learning unit 125 determines whether or not a predetermined termination condition is met, such as that the error in the output result falls below a specified value of the learning parameter 126 (S36). When the termination condition is not met (S36: NO), the learning unit 125 returns the processing to S32 to repeat learning using another pair of teaching data. When the termination condition is met (S36: YES), the learning unit 125 saves the weight of each node in the NN as the learning model 127, and then terminates the processing.

Figure 9:
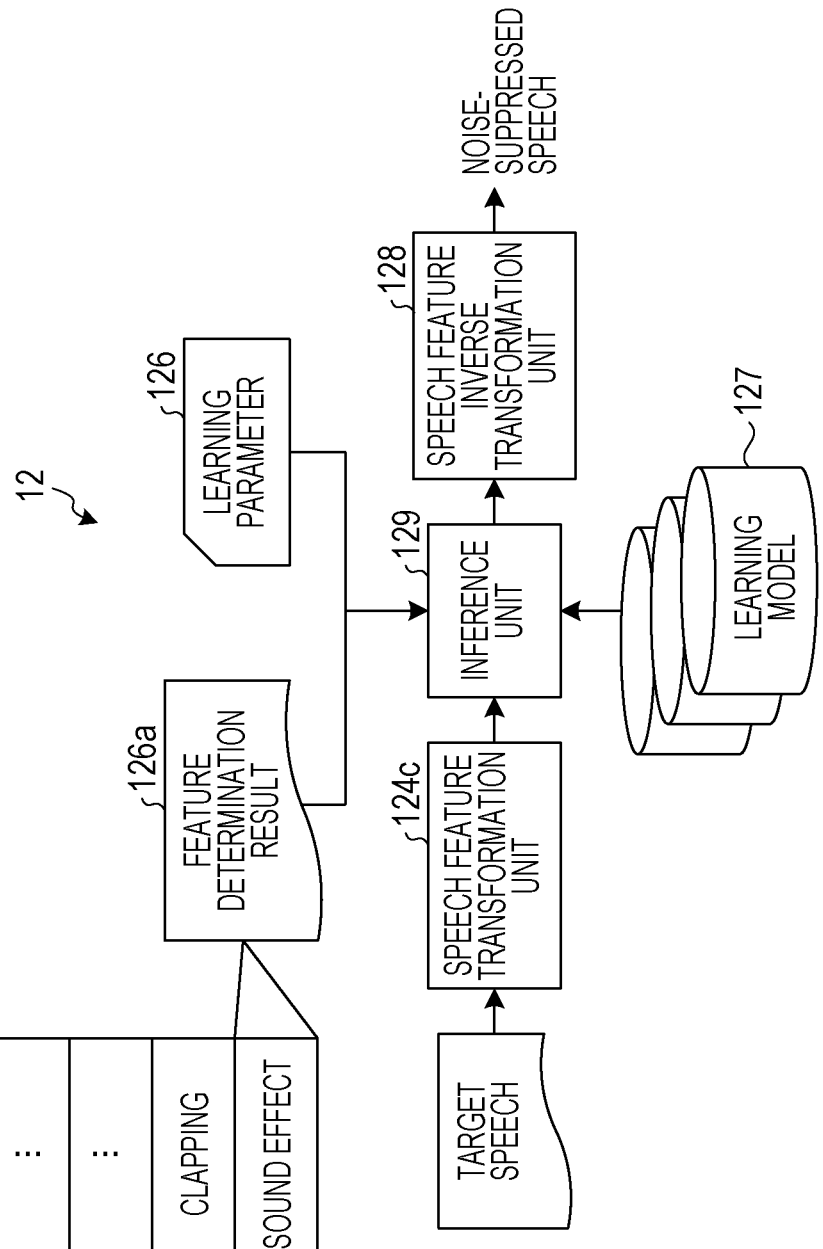
FIG. 9 is a block diagram illustrating a functional configuration example for inference by the noise suppression unit.

FIG. 9 is a block diagram illustrating a functional configuration example for inference by the noise suppression unit 12. As illustrated in FIG. 9, the noise suppression unit 12 includes a speech feature transformation unit 124c, the learning model 127, an inference unit 129, and the speech feature inverse transformation unit 128.

The speech feature transformation unit 124c transforms a target speech to be subjected to speech recognition into a speech feature amount at predetermined time intervals (for example, by several seconds) as in the case of the learning.

The learning model 127 is the weight of each node in the NN or the like, which is obtained by the learning for each feature of noise or unwanted sound.

The inference unit 129 uses the NN built based on the learned learning model 127 to obtain an inference result having suppressed noise or unwanted sound included in the target speech. For example, based on a feature determination result 126a on the feature of noise or unwanted sound in each time interval, which is determined d by the noise feature extraction unit 11, the inference unit 129 builds the NN by retrieving the learning model 127 for the determined feature of noise or unwanted sound. Next, the inference unit 129 inputs the speech feature amount obtained through the feature transformation by the speech feature transformation unit 124c to the built NN, and obtains an inference result having suppressed noise or unwanted sound from the NN. The inference unit 129 repeats the processing of obtaining the inference result by building the NN for all the features of noise or unwanted sound in the feature determination result 126a. Thus, the inference unit 129 performs the noise suppression process for each of the extracted features of noise or unwanted sound.

The speech feature inverse transformation unit 128 performs transformation (for example, inverse Fourier transformation) inverse to the transformation processing performed by the speech feature transformation unit 124c on the data subjected to the noise suppression processing by the inference unit 129 to restore the speech data with suppressed noise or unwanted sound.

Figure 10:
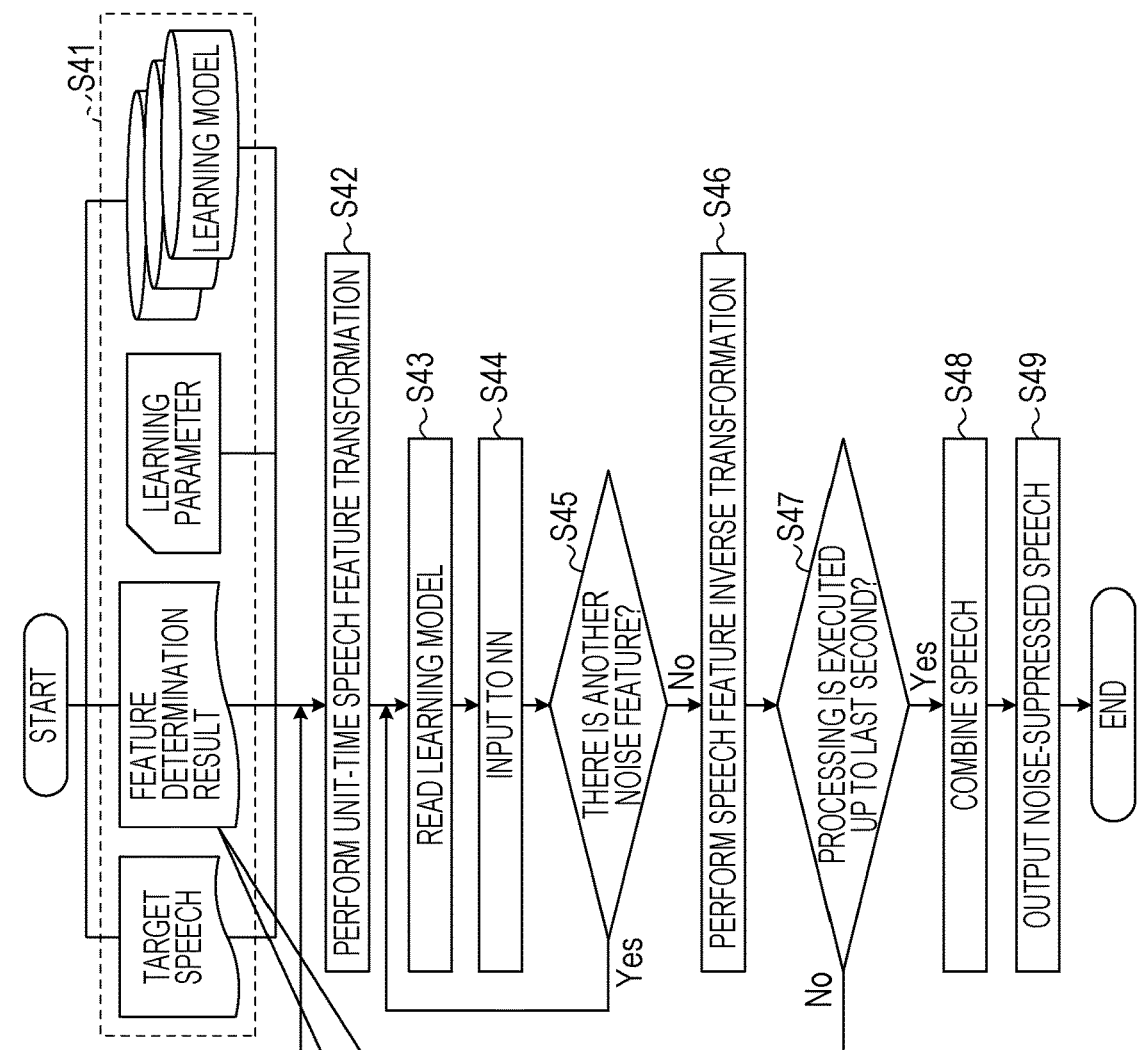
FIG. 10 is a flowchart illustrating an operation example for the inference by the noise suppression unit.

FIG. 10 is a flowchart illustrating an operation example for the inference by the noise suppression unit 12. As illustrated in FIG. 10, once processing is started, the noise suppression unit 12 retrieves data on processing for the target speech, the feature determination result 126a, the learning parameter 126, the learning model 127, and the like (S41).

Next, the speech feature transformation unit 124c transforms the target speech into a speech feature amount by predetermined time unit (S42). Then, the inference unit 129 retrieves a determination result on the corresponding time from the feature determination result 126a, and loads the learning model 127 for the category (feature of noise or unwanted sound) indicated by the determination result (S43).

Thereafter, the inference unit 129 builds an NN based on the loaded learning model 127, inputs the transformed speech feature amount to the NN, and obtains output of an inference result from the NN (S44).

Subsequently, the inference unit 129 determines, by referring to the feature determination result 126a, whether or not there is another unprocessed feature of noise or unwanted sound in the same time interval (S45). For example, in the feature determination result 126a, "BGM A" and "clapping" are extracted as the features of noise or unwanted sound in the time interval between 0 s and 12 s. Therefore, when the noise suppression process is first performed for "BGM A", "clapping" is left as an unprocessed feature of noise or unwanted sound.

When there is another feature of noise or unwanted sound (S45: YES), the inference unit 129 returns the processing to S43 to repeat the processing to obtain the inference result having noise or unwanted sound suppressed for that feature of noise or unwanted sound.

When there is no other feature of noise or unwanted sound (S45: NO), the speech feature inverse transformation unit 128 performs inverse transformation processing on the data subjected to the noise suppression processing to restore speech data with suppressed noise or unwanted sound (S46).

Then, the noise suppression unit 12 determines whether or not the processing has been performed up to the last time unit for the target speech (S47). When the processing has not been performed up to the last time unit (S47: NO), the noise suppression unit 12 returns the processing to S42 to perform noise suppression processing for the next time unit.

When the processing has been performed up to the last time unit (S47: YES), the speech feature inverse transformation unit 128 combines the speech data of all the time units (S48) and outputs a speech having noise or unwanted sound suppressed for the target speech (S49).

Referring back to FIG. 2, after S3, the non-recognition-target processing unit 13 performs non-recognition-target processing by determining a non-recognition-target speech for the noise-suppressed speech and silencing the non-recognition-target speech (S4).

For example, the non-recognition-target processing unit 13 prepares in advance a database of non-recognition-target speeches (for example, speech of foreign language, cheering, laughter, and the like) and uses a method such as deep learning using such speeches as a teacher to perform learning of a learning model that is a neural network for determining the non-recognition-target speech. The non-recognition-target processing unit 13 determines a non-recognition-target speech (for example, speech of foreign language, cheering, laughter, and the like) included in a speech to be processed, by inputting the speech to be processed to the learned learning model to obtain an inference result. Next, the non-recognition-target processing unit 13 performs speech filter processing depending on the determination result to silence the non-recognition-target speech.

Figure 11:
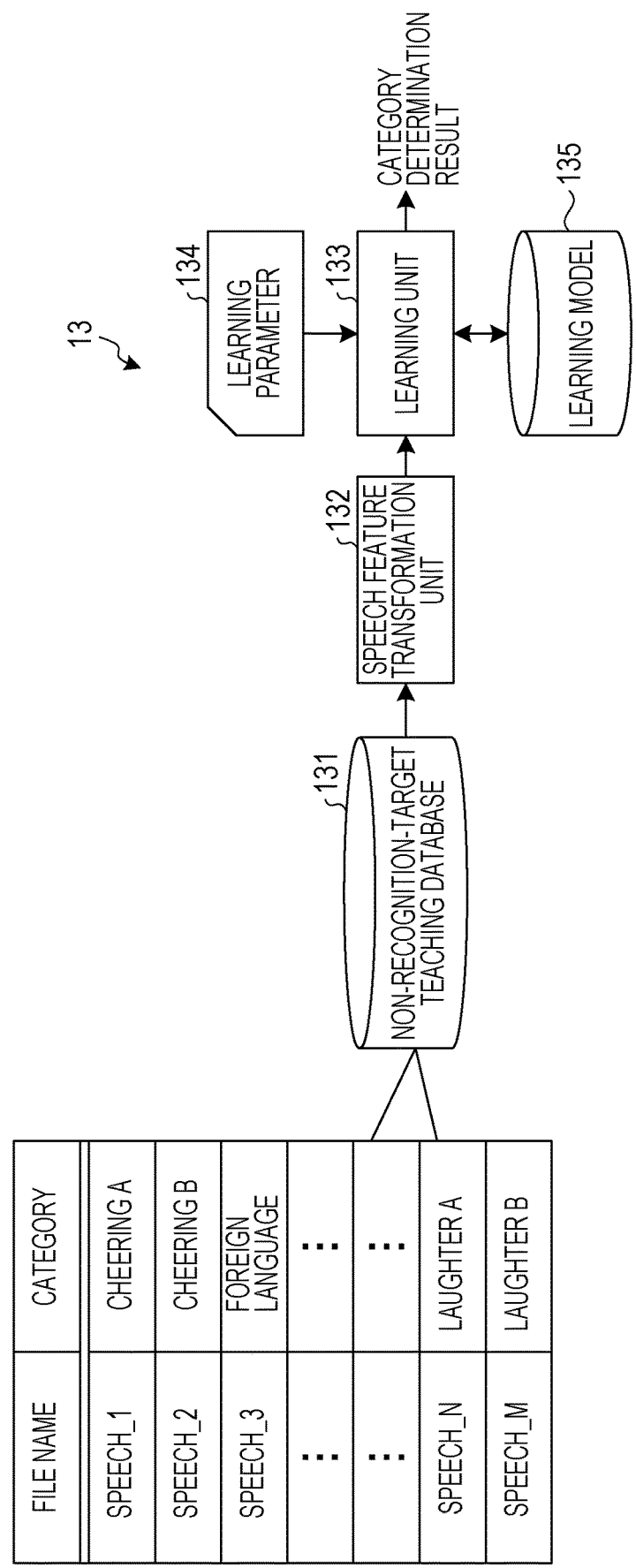
FIG. 11 is a block diagram illustrating a functional configuration example for learning by a non-recognition-target processing unit.

FIG. 11 is a block diagram illustrating a functional configuration example for learning by the non-recognition-target processing unit 13. As illustrated in FIG. 11, the non-recognition-target processing unit 13 includes a non-recognition-target teaching database 131, a speech feature transformation unit 132, and a learning unit 133, as a functional configuration for learning.

The non-recognition-target teaching database 131 is a database that manages a speech file including non-recognition-target speeches such as cheering, foreign language, and laughter, in association with values of categories indicating features of the non-recognition-target speeches included in the speech file. The speech data in the non-recognition-target teaching database 131 is teaching data for use in learning of a learning model 135 to determine the non-recognition-target speech.

The speech feature transformation unit 132 performs speech feature transformation for the speech data included in the speech file in the non-recognition-target teaching database 131, and then outputs the resultant speech data to the learning unit 133 together with the category value. The speech feature transformation is spectrogram transformation or transformation into a commonly used speech feature amount such as MFCC.

The learning unit 133 uses the speech feature amount obtained through the speech feature transformation unit 132 and the category value as teaching data to perform learning of the learning model 135 that is an NN for determining a non-recognition-target speech corresponding to the category value.

For example, the learning unit 133 builds an NN by referring to preset values for learning and a learning parameter 134 such as a hyper parameter for building an initial NN. Next, the learning unit 133 inputs the speech feature amount obtained through the speech feature transformation unit 132 to the built NN, compares the output result thereof with the category, and uses an error backpropagation method or the like, if there is an error, to update weight in each node of the NN.

Figure 12:
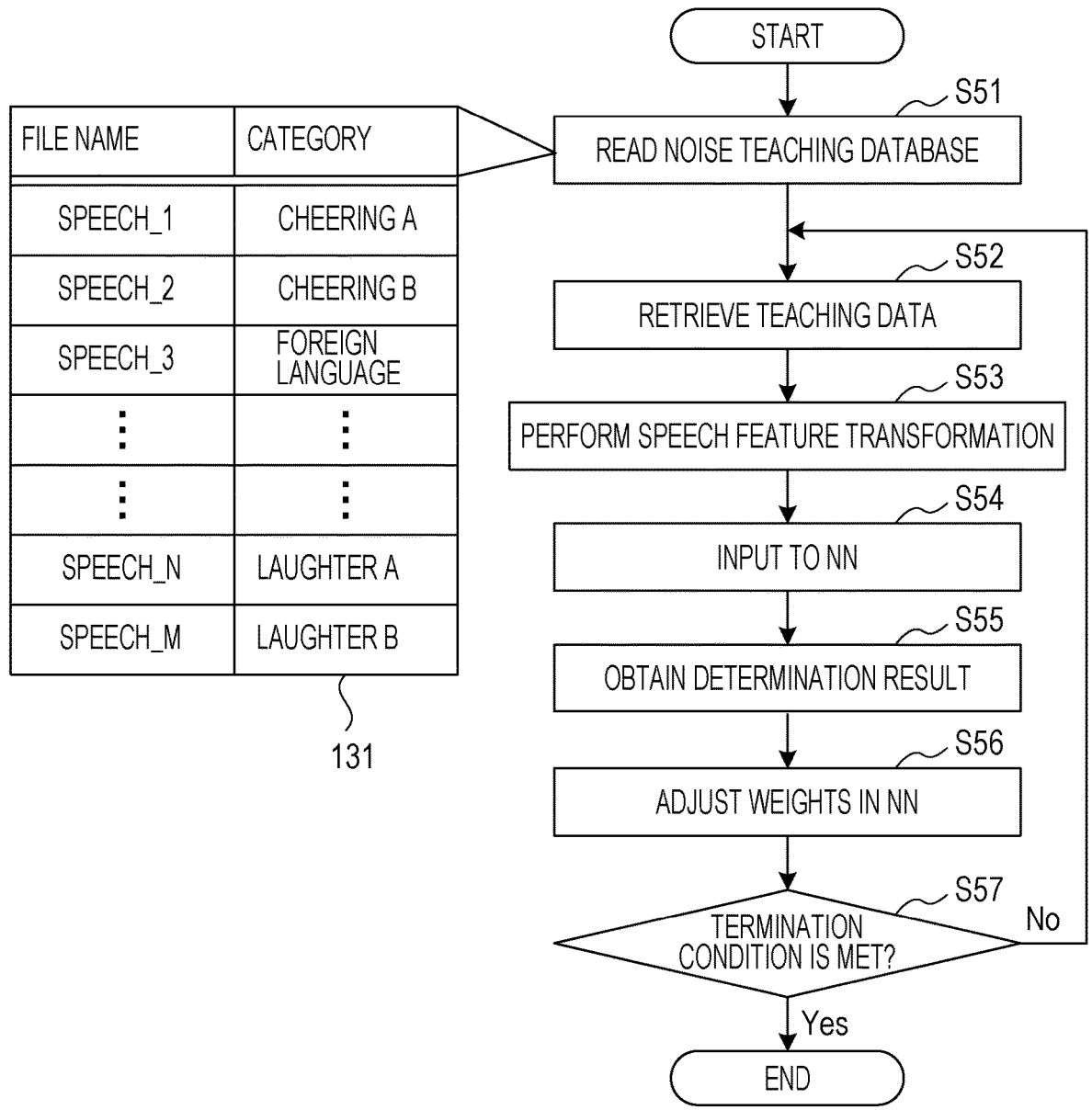
FIG. 12 is a flowchart illustrating an operation example for the learning by the non-recognition-target processing unit.

FIG. 12 is a flowchart illustrating an operation example for the learning by the non-recognition-target processing unit 13. As illustrated in FIG. 12, once processing is started, the speech feature transformation unit 132 reads the non-recognition-target teaching database 131 (S51) to retrieve teaching data including a speech file and a category value as a pair (S52). Next, the speech feature transformation unit 132 performs speech feature transformation for speech data included in the speech file (S53).

Then, the learning unit 133 inputs the speech feature amount after the feature transformation to the NN (S54) and obtains a determination result from the NN (S55). Thereafter, the learning unit 133 calculates an error (difference) by comparing the determination result from the NN with the category value (correct answer information) in the teaching data. Subsequently, the learning unit 133 performs the error backpropagation method for changing and approximating the parameters of each node in the NN to an optimum solution by back-propagating the obtained difference to the NN, thus adjusting the weight of each node in the NN (S56).

Next, the learning unit 133 determines whether or not a predetermined termination condition is met, such as that the error in the determination result falls below a specified value of the learning parameter 134 (S57). When the termination condition is not met (S57: NO), the speech feature transformation unit 132 returns the processing to S52 to repeat learning using another pair of teaching data. When the termination condition is met (S57: YES), the learning unit 133 saves the weight of each node in the NN as the learning model 135, and then terminates the processing.

Figure 13:
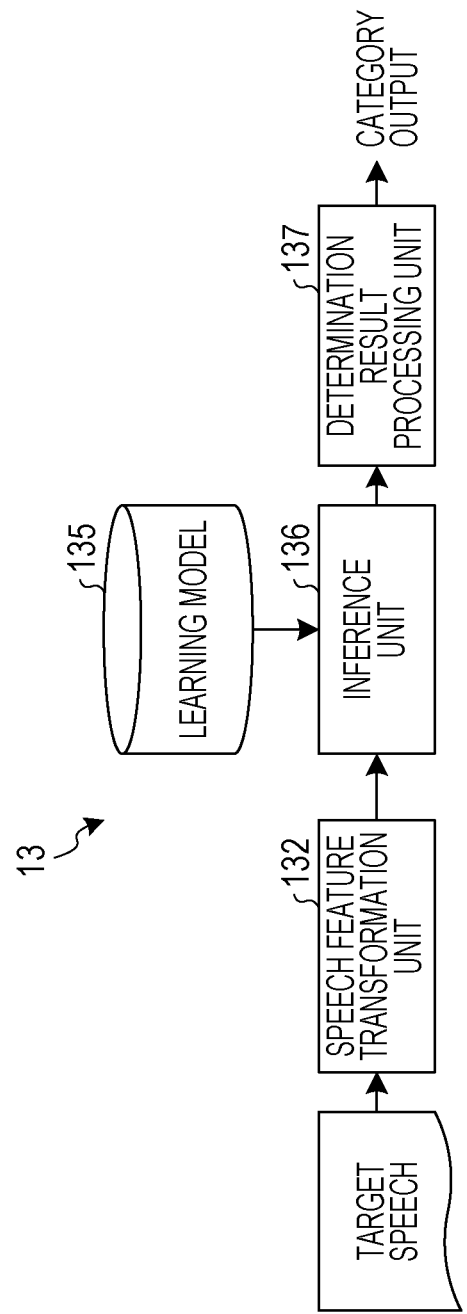
FIG. 13 is a block diagram illustrating a functional configuration example for inference by the non-recognition-target processing unit.

FIG. 13 is a block diagram illustrating a functional configuration example for inference by the non-recognition-target processing unit 13. As illustrated in FIG. 13, the non-recognition-target processing unit 13 includes the speech feature transformation unit 132, an inference unit 136, and a determination result processing unit 137.

The speech feature transformation unit 132 transforms a target speech into a speech feature amount at predetermined time intervals (for example, by several seconds) as in the case of the learning.

The inference unit 136 uses the NN built based on the learned learning model 135 to infer (determine) a non-recognition-target speech (category value) included in the target speech. For example, the inference unit 136 inputs the speech feature amount after the feature transformation by the speech feature transformation unit 132 to the NN, and obtains output of the determination result from the NN.

Based on the determination result obtained at the predetermined time intervals for the target speech by the inference unit 136, the determination result processing unit 137 performs speech filter processing depending on the determination result to silence and then output the non-recognition-target speech.

Figure 14:
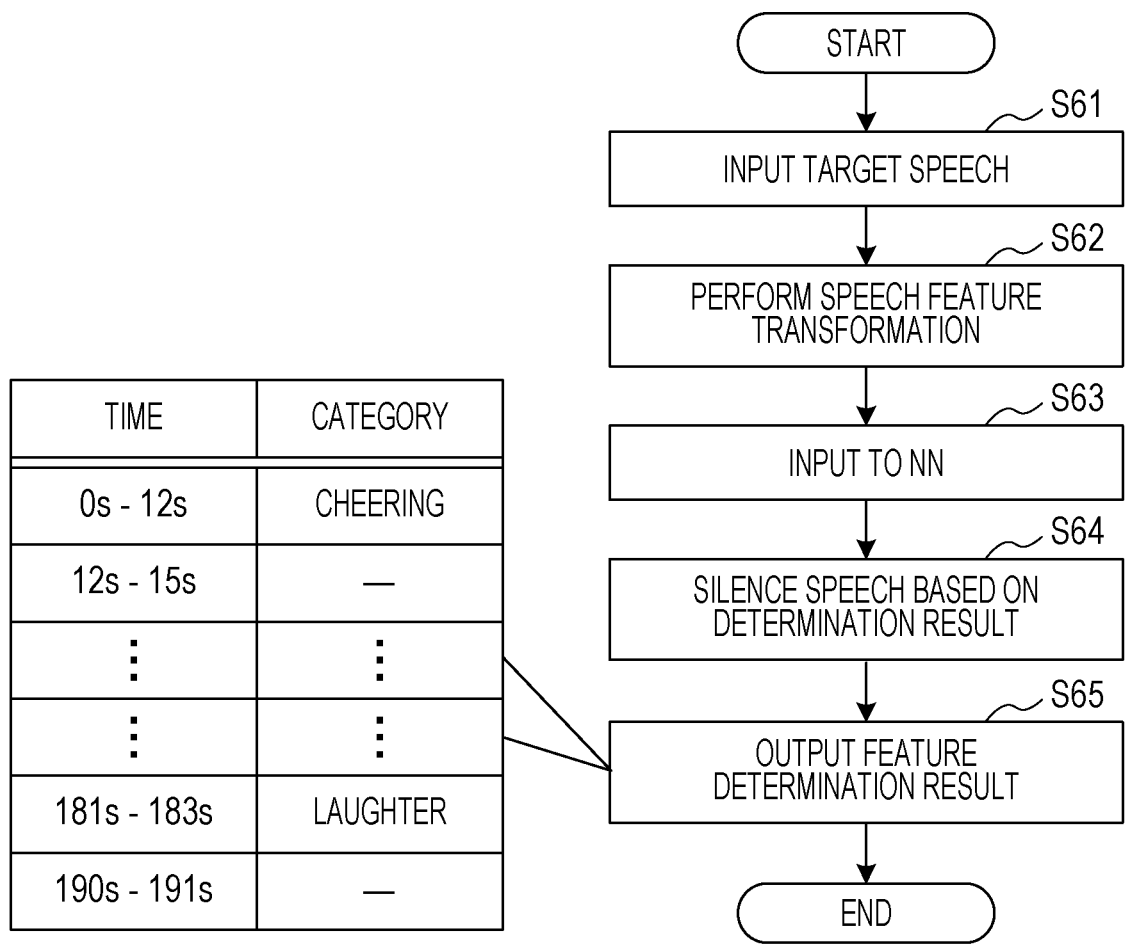
FIG. 14 is a flowchart illustrating an operation example for the inference by the non-recognition-target processing unit.

FIG. 14 is a flowchart illustrating an operation example for the inference by the non-recognition-target processing unit 13. As illustrated in FIG. 14, once processing is started, the speech feature transformation unit 132 receives input of a target speech (S61) and performs feature transformation of the target speech at predetermined time intervals (S62).

Next, the inference unit 136 inputs the speech feature amount obtained by the feature transformation to the NN using the learned learning model 135 (S63) and obtains a determination result for each time interval. Then, the determination result processing unit 137 performs speech filter processing depending on the determination result obtained by the inference unit 136 for each time interval to silence the non-recognition-target speech in each time interval (S64). Thereafter, the determination result processing unit 137 outputs the speech data obtained by silencing the non-recognition-target speech (S65) and then terminates the processing.

Referring back to FIG. 2, after S4, the speech recognition selection unit 14 determines a speech recognition engine to be used for the target speech among the plurality of speech recognition engines (speech recognition engines A to C in the example of FIG. 2) in the speech recognition unit 15 (S5).

For example, the speech recognition selection unit 14 prepares a database for a speech as an evaluation sample and a recognition rate when the speech is recognized by each speech recognition engine.

Figure 15:
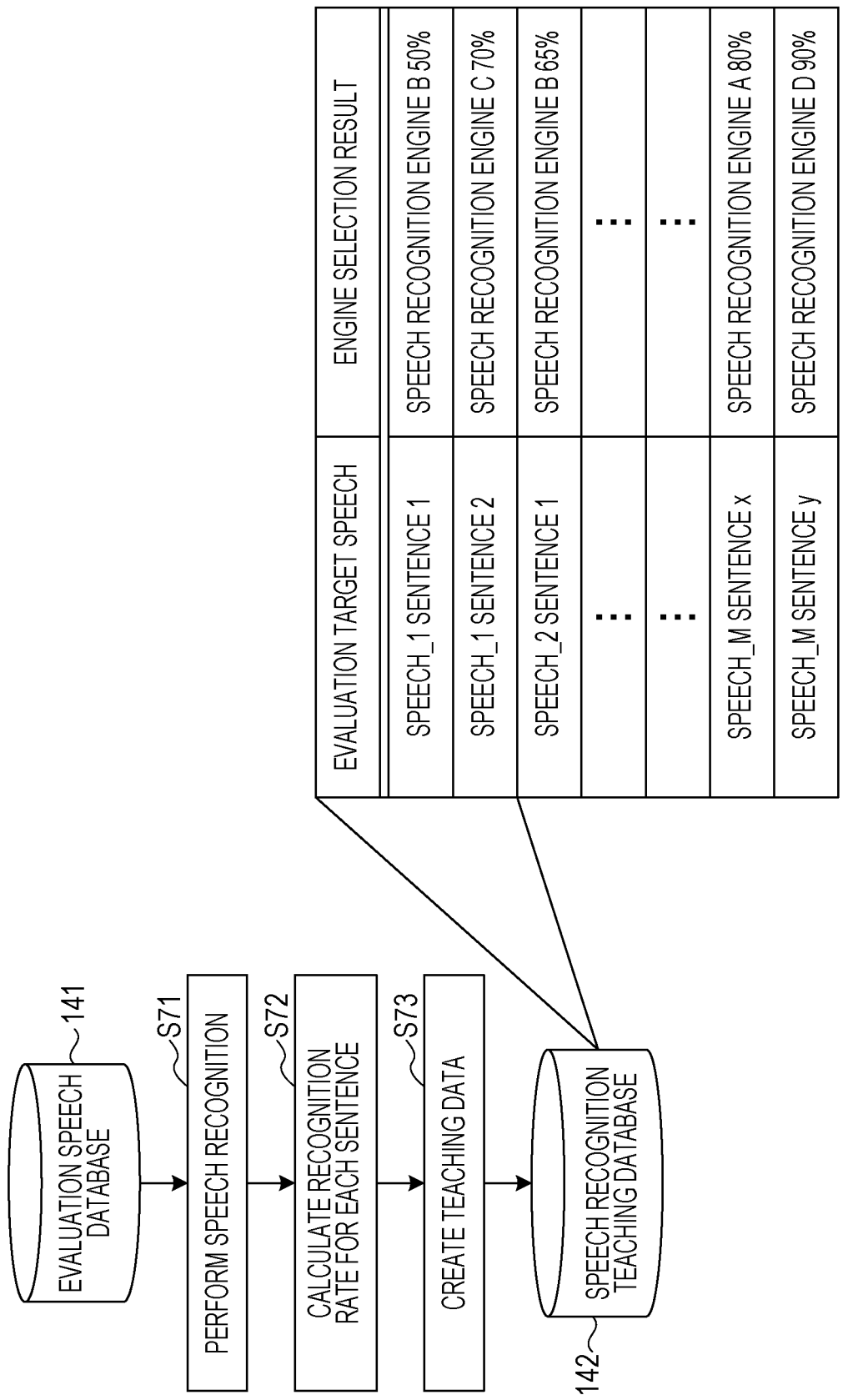
FIG. 15 is an explanatory diagram explaining generation of a speech recognition teaching database.

FIG. 15 is an explanatory diagram explaining generation of a speech recognition teaching database. As illustrated in FIG. 15, the speech recognition selection unit 14 reads a sample speech in an evaluation speech database 141 to perform speech recognition by sentence using the plurality of speech recognition engines in the speech recognition unit 15 (S71). Next, the speech recognition selection unit 14 calculates a recognition rate for each sentence by comparing with a correct answer (recognition result) stored in association with the speech in the evaluation speech database 141 (S72).

Then, the speech recognition selection unit 14 creates teaching data for the evaluation target speech based on the calculated recognition rate (S73) and stores the created teaching data in the speech recognition teaching database 142. For example, as for the evaluation target speech, the speech recognition selection unit 14 stores the recognition rate (engine selection result) in each speech recognition engine for each sentence, as the teaching data, in the speech recognition teaching database 142.

Next, the speech recognition selection unit 14 uses the teaching data in the speech recognition teaching database 142 to perform learning of a learning model that is a neural network for estimating (selecting) the speech recognition engine based on the recognition rate in each speech recognition engine by the use of a method such as deep learning. Then, the speech recognition selection unit 14 inputs the target speech to the learned learning model and selects a speech recognition engine estimated to have the highest recognition rate, for example, from among the plurality of speech recognition engines, based on the recognition rate in each speech recognition engine.

Figure 16:
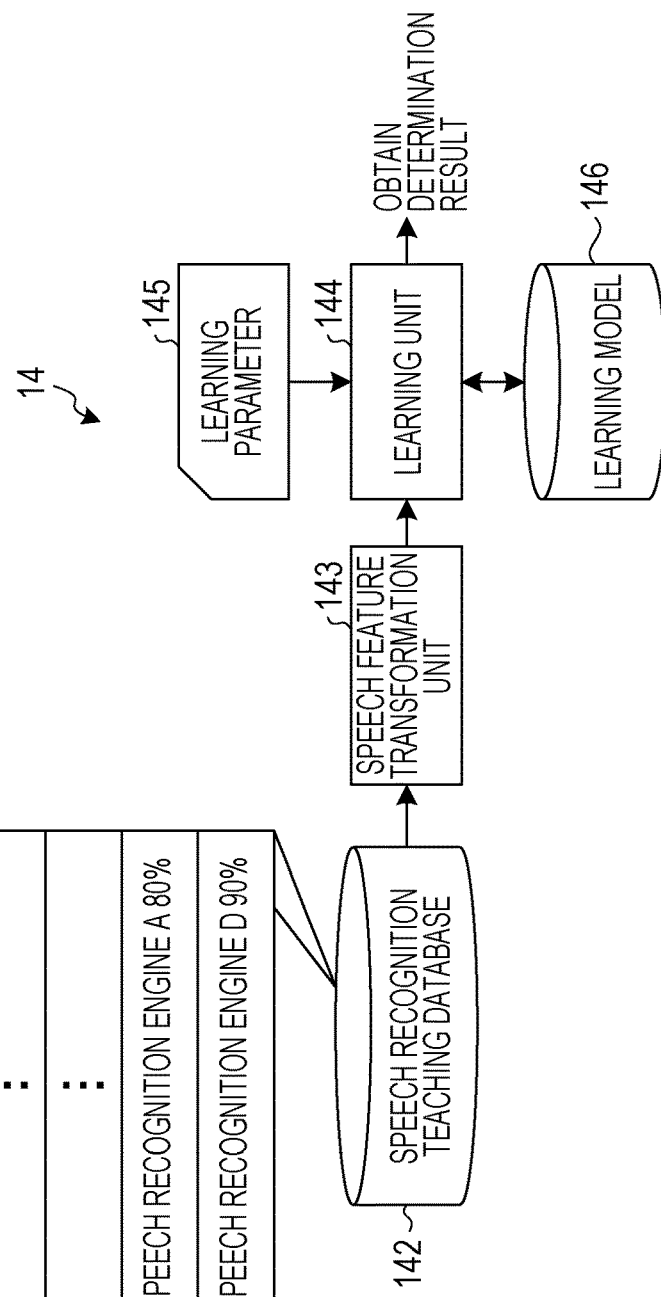
FIG. 16 is a block diagram illustrating a functional configuration example for learning by a speech recognition selection unit.

FIG. 16 is a block diagram illustrating a functional configuration example for learning by the speech recognition selection unit 14. As illustrated in FIG. 16, the speech recognition selection unit 14 includes the speech recognition teaching database 142, a speech feature transformation unit 143, and a learning unit 144, as a functional configuration for learning.

The speech feature transformation unit 143 performs speech feature transformation for the speech data included in the speech file in the speech recognition teaching database 142, and then outputs the resultant speech data to the learning unit 144 together with the speech recognition engine and the recognition rate (engine selection result) thereof. The speech feature transformation is spectrogram transformation or transformation into a commonly used speech feature amount such as MFCC.

The learning unit 144 uses the speech feature amount obtained through the speech feature transformation unit 132, the speech recognition engine, and the recognition rate thereof as the teaching data to perform learning of the learning model 146 that is the NN for estimating the recognition rate of the speech recognition engine to select the speech recognition engine.

For example, the learning unit 144 builds an NN by referring to preset values for learning and a learning parameter 145 such as a hyper parameter for building an initial NN. Then, the learning unit 144 inputs the speech feature amount obtained through the speech feature transformation unit 143 to the built NN, and compares the output result thereof (recognition rate of each speech recognition engine) with correct answer information (engine selection result) in the teaching data. When there is an error as a result of the comparison, the learning unit 144 uses an error backpropagation method or the like to update weight in each node of the NN.

Figure 17:
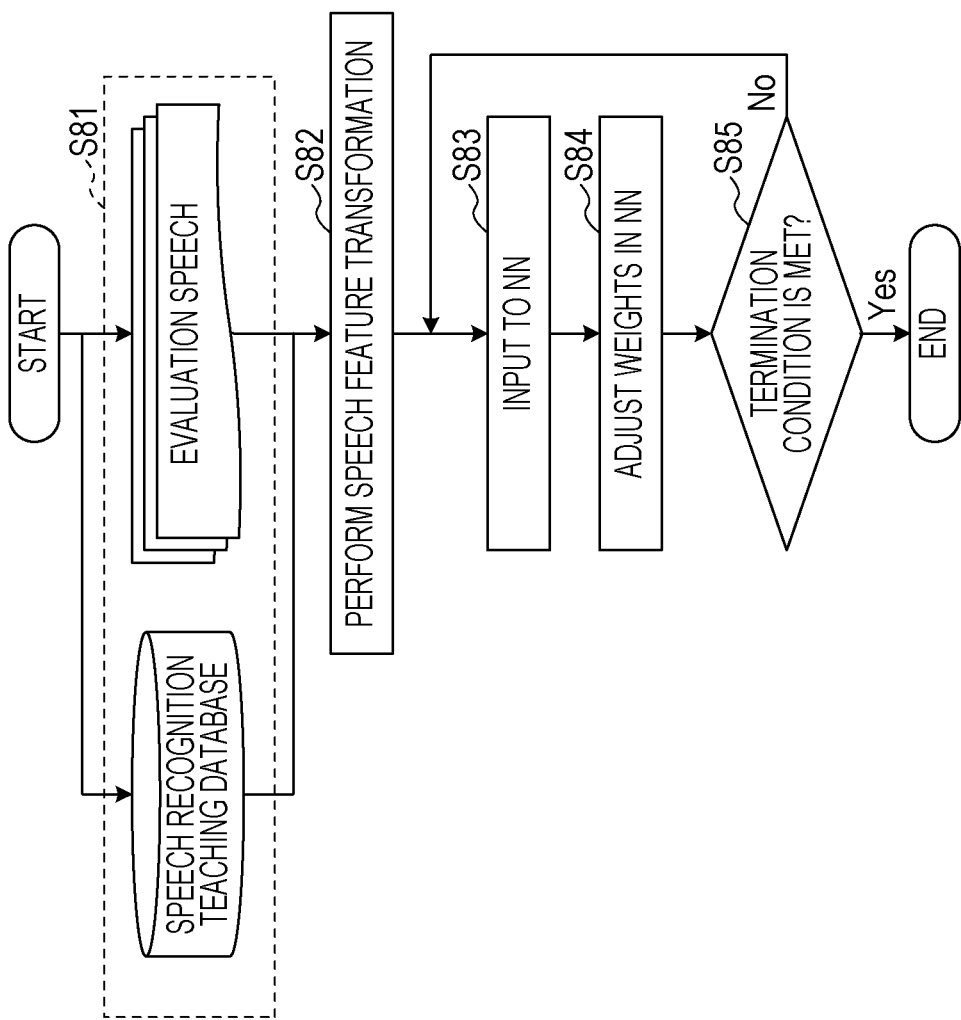
FIG. 17 is a flowchart illustrating an operation example for the learning by the speech recognition selection unit.

FIG. 17 is a flowchart illustrating an operation example for the learning by the speech recognition selection unit 14. As illustrated in FIG. 17, once processing is started, the speech recognition selection unit 14 receives the speech recognition teaching database 142 and evaluation speech input (S81).

Next, the speech feature transformation unit 143 retrieves data (evaluation target speech and engine selection result) required for learning from the speech feature transformation unit 143 to perform speech feature transformation for the evaluation target speech (S82).

Then, the learning unit 144 inputs the speech feature amount after the feature transformation to the NN, and obtains an output result from the NN (S83). Thereafter, the learning unit 144 calculates an error (difference) by comparing the output result from the NN with the correct answer information (engine selection result) in the teaching data. Subsequently, the learning unit 144 performs the error backpropagation method for changing and approximating the parameters of each node in the NN to an optimum solution by back-propagating the obtained difference to the NN, thus adjusting the weight of each node in the NN (S84).

Next, the learning unit 144 determines whether or not a predetermined termination condition is met, such as that the error in the output result falls below a specified value of the learning parameter 145 (S85). When the termination condition is not met (S85: NO), the learning unit 144 returns the processing to S83 to repeat learning using another pair of teaching data. When the termination condition is met (S85: YES), the learning unit 144 saves the weight of each node in the NN as the learning model 146, and then terminates the processing.

Figure 18:
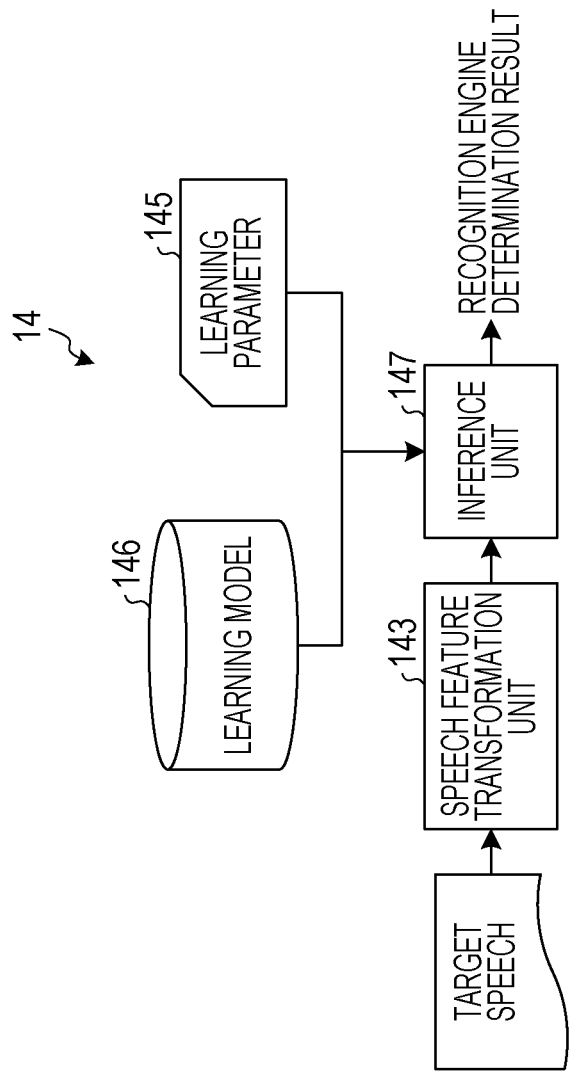
FIG. 18 is a block diagram illustrating a functional configuration example for inference by the speech recognition selection unit.

FIG. 18 is a block diagram illustrating a functional configuration example for inference by the speech recognition selection unit 14. As illustrated in FIG. 18, the speech recognition selection unit 14 includes the speech feature transformation unit 143 and an inference unit 147 as a functional configuration for inference.

The speech feature transformation unit 143 transforms a target speech to be subjected to speech recognition into a speech feature amount at predetermined time intervals (for example, by several seconds) as in the case of the learning.

The inference unit 147 uses the NN built based on the learned learning parameter 145 to estimate a recognition rate of each of the plurality of speech recognition engines in the target speech at predetermined time intervals. Then, based on the estimated recognition rates, the inference unit 147 selects a speech recognition engine estimated to have the highest recognition rate, for example, from among the plurality of speech recognition engines.

For example, the inference unit 147 retrieves the learning model 146 to build the NN. Next, the inference unit 147 inputs the speech feature amount obtained through the feature transformation by the speech feature transformation unit 143 to the built NN, and obtains an inference result (recognition rate of each speech recognition engine) from the NN. Then, the inference unit 147 selects (determines) a speech recognition engine based on the obtained recognition rate, and outputs the determination result.

Figure 19:
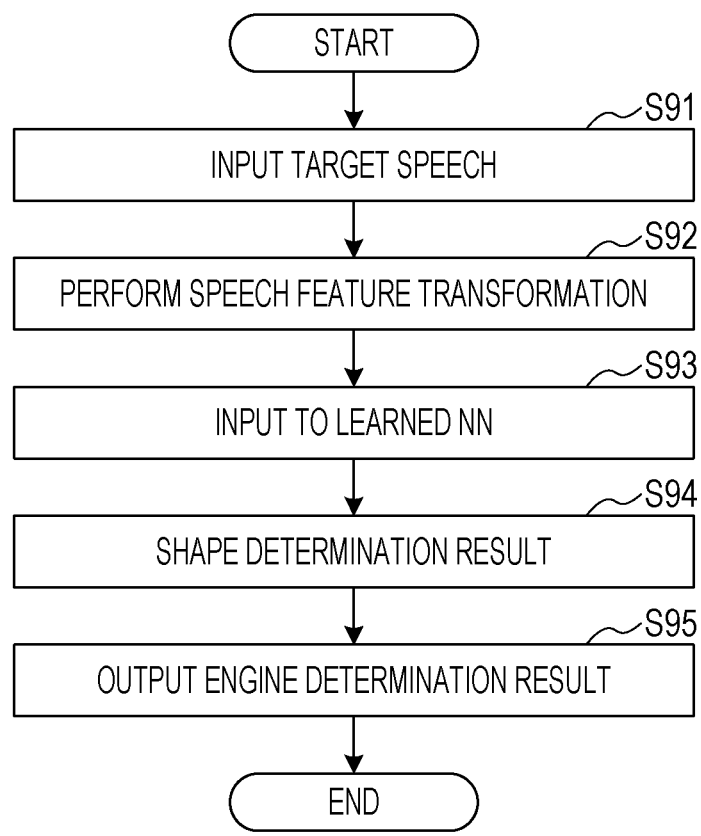
FIG. 19 is a flowchart illustrating an operation example for the inference by the speech recognition selection unit.

FIG. 19 is a flowchart illustrating an operation example for the inference by the speech recognition selection unit 14. As illustrated in FIG. 19, once processing is started, the speech recognition selection unit 14 receives input of a speech (target speech) with suppressed noise or unwanted sound, which is outputted from the non-recognition-target processing unit 13 (S91). Next, the speech feature transformation unit 143 performs feature transformation of the target speech at predetermined time intervals (S92).

Next, the inference unit 147 inputs the speech feature amount obtained by the feature transformation to the NN using the learned learning model 146 (S93) and obtains a determination result (recognition rate of each speech recognition engine) for each time interval. Then, the inference unit 147 shapes the determination result for each time interval (S94). For example, the inference unit 147 selects the speech recognition engine having the highest recognition rate in the determination result for a predetermined time interval, as the speech recognition engine in that time interval. Then, the inference unit 147 outputs the determination result of the speech recognition engine for each time interval (S95).

Referring back to FIG. 2, after S5, the speech recognition unit 15 uses the speech recognition engine selected by the speech recognition selection unit 14 from among the plurality of speech recognition engines (speech recognition engines A to C in the example of FIG. 2) to perform speech recognition for the input speech with suppressed noise or unwanted sound (S6). Next, the speech recognition unit 15 outputs a recognition result (recognized text) obtained by the speech recognition engine (S7).

As described above, the speech recognition apparatus 1 includes the noise feature extraction unit 11, the noise suppression unit 12, and the speech recognition unit 15. The noise feature extraction unit 11 extracts features of noise or unwanted sound included in the recognition target input speech (speech data). The noise suppression unit 12 performs a suppression process for the speech data by executing a suppression process for each of the extracted features of noise or unwanted sound among suppression processes for respective features of noise or unwanted sound. The speech recognition unit 15 performs speech recognition for the speech data after the suppression processing. Thus, the speech recognition apparatus 1 may improve the speech recognition rate in an environment, for example, where various noises or unwanted sounds are superimposed.

The speech recognition apparatus 1 includes a plurality of learning models 127 learned to suppress respective types of noise or unwanted sound according to features of the noise or unwanted sound. The noise suppression unit 12 performs a suppression process using the learning model 127 for each of the extracted features of noise or unwanted sound among the plurality of learning models 127. Thus, the speech recognition apparatus 1 performs the suppression process using the learning model 127 learned with a deep learning method, for example, for each of features (BGM, environmental sound, sound effect, and the like) of noise or unwanted sound. As a result, the speech recognition apparatus 1 may effectively suppress noise or unwanted sound according to the feature of the noise or unwanted sound.

The speech recognition apparatus 1 includes the speech recognition selection unit 14 that selects any one of the plurality of speech recognition engines based on the recognition rate of each of the speech recognition engines, which is estimated according to the speech data after the suppression processing. The speech recognition unit 15 uses the speech recognition engine selected by the speech recognition selection unit 14 to perform the speech recognition. Thus, the speech recognition apparatus 1 may accurately perform the speech recognition by selecting the speech recognition engine estimated to have the high recognition rate, for example.

All of or some of the various processing functions executed by the speech recognition apparatus 1 may be executed on a central processing unit (CPU) (or a microcomputer such as a micro processing unit (MPU) or a micro controller unit (MCU)). Needless to say, all of or some of the various processing functions may be executed on a program analyzed and executed by the CPU (or a microcomputer such as an MPU or an MCU) or on hardware using wired logic. Such various processing functions executed by the speech recognition apparatus 1 may also be executed by a plurality of computers in cooperation through cloud computing.

Figure 20:
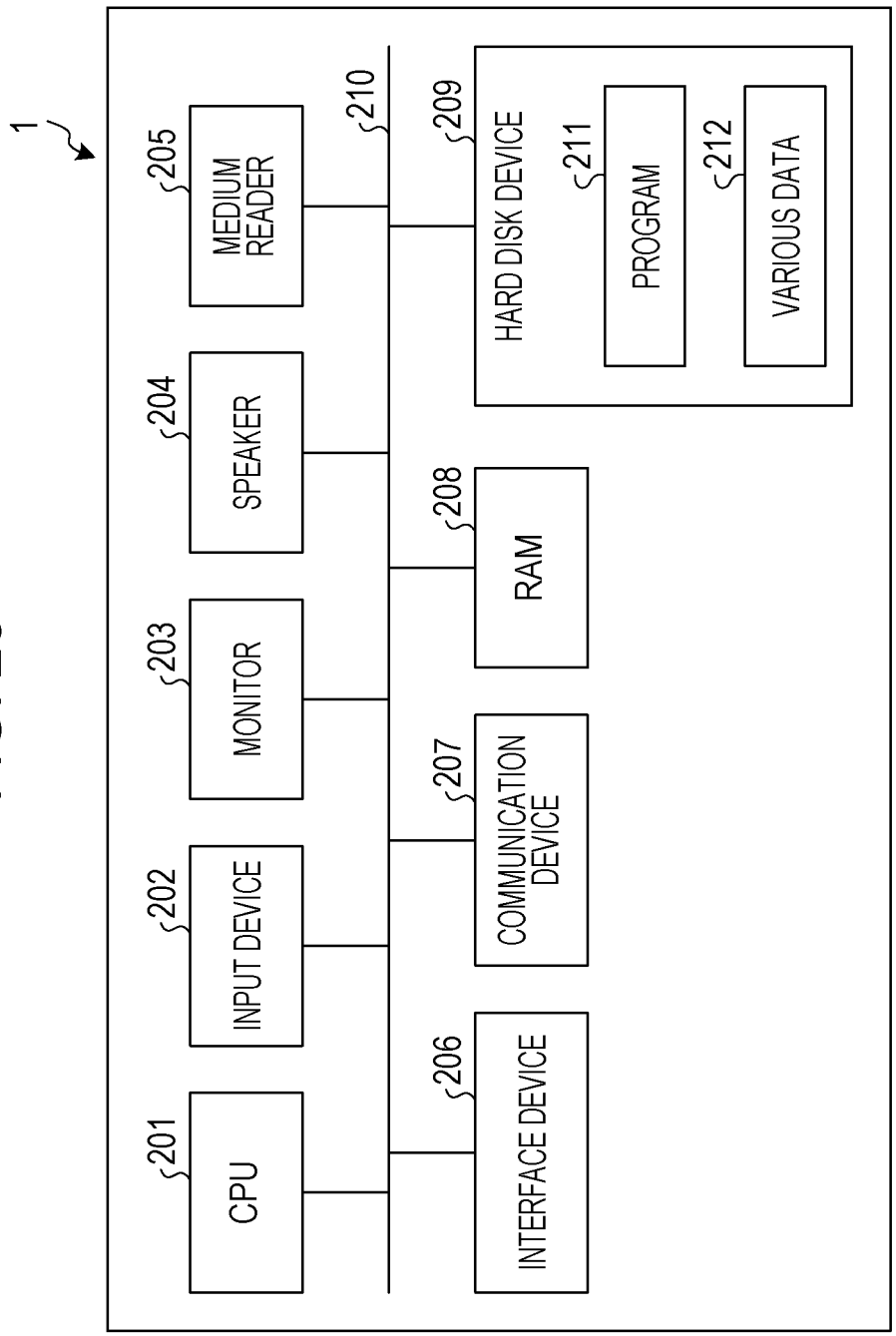
FIG. 20 is a block diagram illustrating an example of a hardware configuration of the speech recognition apparatus according to the embodiment.

The various kinds of processing described in the above embodiment may be realized by a computer executing a prepared program. Hereinafter, description is given of an example of a computer (hardware) that executes a program with the same functions as those of the above embodiment. FIG. 20 is a block diagram illustrating an example of a hardware configuration of the speech recognition apparatus 1 according to the embodiment.

As illustrated in FIG. 20, the speech recognition apparatus 1 includes a CPU 201 that executes various kinds of arithmetic processing, an input device 202 that receives data input, a monitor 203, and a speaker 204. The speech recognition apparatus 1 also includes a medium reader 205 that reads programs and the like from a storage medium, an interface device 206 for connecting to various devices, and a communication device 207 for wired or wireless connection with an external device for communication. The speech recognition apparatus 1 further includes a RAM 208 that temporarily stores various information and a hard disk device 209. The respective units (201 to 209) in the speech recognition apparatus 1 are connected to a bus 210.

The hard disk device 209 stores a program 211 for executing various kinds of processing associated with the control unit 10, the noise feature extraction unit 11, the noise suppression unit 12, the non-recognition-target processing unit 13, the speech recognition selection unit 14, and the speech recognition unit 15 described in the above embodiment. The hard disk device 209 also stores various data 212 to be referred to by the program 211. The input device 202 receives input of operation information from an operator of the speech recognition apparatus 1, for example. The monitor 203 displays various screens operated by the operator, for example. The interface device 206 has a printer and the like, for example, connected thereto. The communication device 207 is connected to a communication network such as a local area network (LAN) to exchange various information with the external device through the communication network.

The CPU 201 performs the various kinds of processing associated with the control unit 10, the noise feature extraction unit 11, the noise suppression unit 12, the non-recognition-target processing unit 13, the speech recognition selection unit 14, and the speech recognition unit 15 by reading the program 211 stored in the hard disk device 209 and developing and executing the program 211 in the RAM 208. The program 211 does not have to be stored in the hard disk device 209. For example, the program 211 stored in a storage medium readable by the speech recognition apparatus 1 may be read and executed by the speech recognition apparatus 1. Examples of the storage medium readable by the speech recognition apparatus 1 include a portable recording medium such as a CD-ROM, a DVD disk, and a Universal Serial Bus (USB) memory, a semiconductor memory such as a flash memory, a hard disk drive, and the like. Alternatively, the program 211 may be stored in a device connected to a public line, the Internet, a LAN, or the like, and may be read from the device and executed by the speech recognition apparatus 1.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A speech recognition apparatus comprising:
a memory, and
a processor coupled to the memory and configured to execute a process including:
extracting features of noise included in speech data to be recognized, wherein the features determine categories of the noise and the categories include at least one of background music (BGM), environment sound, and sound effect;
performing, for the speech data, a suppression process for each of the categories of the noise corresponding to the extracted features among suppression processes for respective categories of the noise;
detecting non-recognition-target speech included in the speech data, the non-recognition-target speech including sound of a voice other than the speech data to be recognized;
performing a speech filtering process to suppress the non-recognition-target speech;
selecting any one of a plurality of speech recognition engines based on a recognition rate of each of the speech recognition engines, the recognition rate being estimated based on a feature amount of the speech data after the suppression process is performed, the selecting comprising:
building a neural network based on a learning model;
inputting the feature amount into the built neural network;
obtaining, from the built neural network, an inference result comprising the recognition rate of the each of the speech recognition engines; and
selecting the any one of the plurality of speech recognition engines based on the obtained recognition rate of the each of the speech recognition engines; and performing speech recognition for the speech data after the performed suppression process using the selected speech recognition engine.

2. The speech recognition apparatus according to claim 1, wherein the suppression process uses a learning model for each of the categories corresponding to the extracted features of the noise among a plurality of learning models learned to suppress respective categories of noise according to the respective features of the noise.

3. A non-transitory computer-readable medium storing a speech recognition program causing a computer to execute a process comprising:

extracting features of noise included in speech data to be recognized, wherein the features determine categories of the noise and the categories include at least one of background music (BGM), environment sound and sound effect;

performing, for the speech data, a suppression process for each of the categories of the noise corresponding to the extracted features among suppression processes for respective categories of the noise;

detecting non-recognition-target speech included in the speech data, the non-recognition-target speech including sound of a voice other than the speech data to be recognized;

performing a speech filtering process to suppress the non-recognition-target speech;

selecting any one of a plurality of speech recognition engines based on a recognition rate of each of the speech recognition engines, the recognition rate being estimated based on a feature amount of the speech data after the suppression process is performed, the selecting comprising:

building a neural network based on a learning model;

inputting the feature amount into the built neural network;

obtaining, from the built neural network, an inference result comprising the recognition rate of the each of the speech recognition engines; and selecting the any one of the plurality of speech recognition engines based on the obtained recognition rate of the each of the speech recognition engines; and performing speech recognition for the speech data after the performed suppression process using the selected speech recognition engine.

4. The medium according to claim 3, wherein the suppression process uses a learning model for each of the categories corresponding to the extracted features of the noise among a plurality of learning models learned to suppress respective categories of noise according to the respective features of the noise.

5. A speech recognition method causing a computer to execute a process comprising:

extracting features of noise included in speech data to be recognized, wherein the features determine categories of the noise and the categories include at least one of background music (BGM), environment sound and sound effect;

performing, for the speech data, a suppression process for each of the categories of the noise corresponding to the extracted features among suppression processes for respective categories of the noise;

detecting non-recognition-target speech included in the speech data, the non-recognition-target speech including sound of a voice other than the speech data to be recognized;

performing a speech filtering process to suppress the non-recognition-target speech;

selecting any one of a plurality of speech recognition engines based on a recognition rate of each of the speech recognition engines, the recognition rate being estimated based on a feature amount of the speech data after the suppression process is performed, the selecting comprising:

building a neural network based on a learning model;

inputting the feature amount into the built neural network;

obtaining, from the built neural network, an inference result comprising the recognition rate of the each of the speech recognition engines; and selecting the any one of the plurality of speech recognition engines based on the obtained recognition rate of the each of the speech recognition engines; and performing speech recognition for the speech data after the performed suppression process using the selected speech recognition engine.

6. The speech recognition method according to claim 5, wherein the suppression process uses a learning model for each of the categories corresponding to the extracted features of the noise among a plurality of learning models learned to suppress respective categories of noise according to the respective features of the noise.

* * * * *